(12) United States Patent
Kashiwagi

(10) Patent No.: US 10,250,009 B2
(45) Date of Patent: Apr. 2, 2019

(54) FIBER LASER SYSTEM AND METHOD OF OUTPUTTING LASER BEAM

(71) Applicant: Fujikura Ltd., Tokyo (JP)

(72) Inventor: Masahiro Kashiwagi, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/450,249

(22) Filed: Mar. 6, 2017

(65) Prior Publication Data

US 2017/0179672 A1 Jun. 22, 2017

Related U.S. Application Data

(63) Continuation of application No. PCT/JP2016/083787, filed on Nov. 15, 2016.

(30) Foreign Application Priority Data

Nov. 17, 2015 (JP) ................................. 2015-224788

(51) Int. Cl.
*H01S 3/30* (2006.01)
*H01S 3/131* (2006.01)
(Continued)

(52) U.S. Cl.
CPC ........ *H01S 3/1312* (2013.01); *B23K 26/0608* (2013.01); *B23K 26/0613* (2013.01); *B23K 26/0622* (2015.10); *H01S 3/067* (2013.01); *H01S 3/091* (2013.01); *H01S 3/0912* (2013.01); *H01S 3/0941* (2013.01);
(Continued)

(58) Field of Classification Search
CPC ........ H01S 3/0912; H01S 3/063; H01S 3/102; H01S 3/2383; H01S 3/094003; H01S 3/091; H01S 3/067; H01S 3/094011; H01S 3/094053; H01S 3/0941; H01S 3/302; H01S 3/1306; H01S 3/1312
See application file for complete search history.

(56) References Cited

U.S. PATENT DOCUMENTS 6,151,338 A * 11/2000 Grubb ................. H01S 3/10023
372/6
2006/0065640 A1* 3/2006 Lizotte ............... B23K 26/0604
219/121.61
(Continued)

FOREIGN PATENT DOCUMENTS

CN 1829012 A 9/2006
CN 103594910 A 2/2014
(Continued)

OTHER PUBLICATIONS

Partial European Search Report dated Nov. 14, 2017, issued in counterpart European Application No. 16838080.6. (12 pages).
(Continued)

*Primary Examiner* — Kinam Park
(74) *Attorney, Agent, or Firm* — Westerman, Hattori, Daniels & Adrian

(57) ABSTRACT

In a fiber laser system (1) for outputting a laser beam obtained by combining a plurality of laser beams outputted by driving the respective fiber laser unit (2a, 2b, 2c), a control section (7) controls a plurality of current sources (6a, 6b, 6c) so that there are time intervals of a certain time between peaks which appear in a case where respective powers of the laser beams rise.

9 Claims, 11 Drawing Sheets

(51) Int. Cl.
  *H01S 3/091*   (2006.01)
  *H01S 3/0941*  (2006.01)
  *H01S 3/094*   (2006.01)
  *H01S 3/13*    (2006.01)
  *H01S 3/067*   (2006.01)
  *H01S 3/102*   (2006.01)
  *H01S 3/23*    (2006.01)
  *B23K 26/06*   (2014.01)
  *B23K 26/0622* (2014.01)

(52) U.S. Cl.
  CPC .. *H01S 3/094011* (2013.01); *H01S 3/094053* (2013.01); *H01S 3/102* (2013.01); *H01S 3/1306* (2013.01); *H01S 3/2383* (2013.01); *H01S 3/302* (2013.01); *H01S 3/094003* (2013.01)

(56) References Cited

U.S. PATENT DOCUMENTS

| | | |
|---|---|---|
| 2006/0198416 A1 | 9/2006 | Yamazaki |
| 2008/0165810 A1 | 7/2008 | Takeda |
| 2009/0310628 A1* | 12/2009 | Yamazaki ............... H01S 3/067 372/6 |
| 2011/0280581 A1 | 11/2011 | Chann et al. |
| 2015/0229095 A1* | 8/2015 | Miyato ............. H01S 3/094003 372/6 |
| 2015/0375337 A1* | 12/2015 | Hayashi ................ B23K 26/38 219/121.61 |
| 2016/0254637 A1* | 9/2016 | Ikoma ................ H01S 3/06716 372/6 |

FOREIGN PATENT DOCUMENTS

| | | |
|---|---|---|
| JP | 6-77572 A | 3/1994 |
| JP | 2002-124724 A | 4/2002 |
| JP | 2004-207420 A | 7/2004 |
| JP | 2009-152516 A | 7/2009 |
| JP | 2009-297777 A | 12/2009 |
| JP | 2014-82307 A | 5/2014 |
| JP | 2015-95641 A | 5/2015 |
| WO | 2012/165389 A1 | 12/2012 |
| WO | 2014/133013 A1 | 9/2014 |

OTHER PUBLICATIONS

International Search Report dated Jan. 17, 2017 issued in counterpart application No. PCT/JP2016/083787. (3 pages).
Decision to Grant a Patent dated Jan. 31, 2017 issued in counterpart Japanese Patent Application No. 2015-224788 (1 page).
Notification of Reason for Refusal dated Oct. 25, 2016, issued in counterpart Japanese Patent Application No. 2015-224788 (2 pages).
Extended (Supplementary) European Search Report dated Mar. 28, 2018, isssued in counterpart application No. 16838080.6. (12 pages).
Office Action dated Jan. 16, 2019, issued in counterpart Chinese Application No. 201680002516.7, with English translation. (18 pages).

\* cited by examiner

FIBER LASER SYSTEM AND METHOD OF OUTPUTTING LASER BEAM

CROSS-REFERENCE TO RELATED APPLICATIONS

This application is a Continuation of PCT International Application No. PCT/JP2016/083787 filed in Japan on Nov. 15, 2016, which claims the benefit of Patent Application No. 2015-224788 filed in Japan on Nov. 17, 2015, the entire contents of which are hereby incorporated by reference.

TECHNICAL FIELD

The present invention relates to a technique of combining a plurality of laser beams.

BACKGROUND ART

In recent years, great attention has been drawn to a fiber laser system which is configured to achieve an output power of several kW (kilowatt) by combining laser beams, which are emitted from a respective plurality of fiber lasers and each of which is substantially a single mode, so as to obtain and output a multi-mode light beam. A fiber laser is a laser device which includes, as a laser medium, an optical fiber having a core to which a rare earth element is added. Such a high-power fiber laser system is mainly used in the field of material processing.

FIG. 11 is a view illustrating a specific configuration of the fiber laser system. As illustrated in FIG. 11, a fiber laser system 10 includes (i) a plurality of fiber laser units (FLU) 20, (ii) an output combiner 30, (iii) an output section 40, (iv) optical fibers f1 which connect the FLUs 20 to the output combiner 30, and (v) an optical fiber f2 which connects the output combiner 30 to the output section 40.

Although not illustrated in FIG. 11, each of the FLUs 20 includes (i) an excitation light source which outputs multi-mode excitation light and (ii) an amplifying optical fiber which amplifies the excitation light so as to obtain and output a laser beam which is substantially a single mode.

The output combiner 30 generates a multi-mode laser beam by combining the laser beams which are outputted from the respective FLUs 20 and each of which is substantially a single mode. The multi-mode laser beam outputted from the output combiner 30 propagates through the optical fiber f2, is converted by the output section 40 into a laser beam L10 (hereinafter referred to as "beam L10") for processing, and in a case where a processing object 50 (i.e. an object to be processed) is provided, is focused on the processing object 50.

Optical fibers (amplifying optical fibers of the FLUs 20, the optical fibers f1, and the optical fiber f2) included in the fiber laser system 10 guide reflected light which results from Rayleigh scattering caused inside the optical fibers, as well as the laser beams (laser beam ultimately outputted as the beam L10) amplified by the amplifying optical fibers. In a case where the fiber laser system 10 is used for material processing, that is, in a case where the beam L10 is emitted toward the processing object 50, part of reflected light L11, which is light obtained when the beam L10 is reflected from the processing object 50, may be returned into the fiber laser system 10 through an output end of the output section 40. In this case, the optical fibers guides also the part of the reflected light L11 which part has been returned to the fiber laser system 10.

It is known that in a case where an output of the beam L10 is increased in the fiber laser system 10 thus configured, a power of light guided through each of the optical fibers is increased so as to cause stimulated Raman scattering (SRS). SRS is a kind of nonlinear optical effect which occurs in a core of each of the optical fibers, wherein the core serves as a medium of SRS. SRS can be regarded as a process of power conversion from a laser beam to a Stokes beam. Particularly in the optical fiber f2 provided so as to follow the output combiner 30, SRS occurs with a high Raman gain (conversion efficiency in the process of power conversion), since the optical fiber f2 guides a laser beam which is obtained by combining the laser beams outputted from the three FLUs 20 and which accordingly has a significantly high power.

As a Raman gain increases, a power of a Stokes beam caused by SRS increases. It is known that the FLUs 20 accordingly have a less stable oscillation state, and consequently invite a failure of the fiber laser system 10 (see Patent Literature 1). In view of this, in the fiber laser system 10, destabilization of oscillation states of the FLUs 20 is prevented by setting a length and core diameter of each of the optical fibers and a power of each of the FLUs so that a power of a Stokes beam relative to a power of the beam L10 is below a certain reference level during steady operation. The reference level differs depending on a reflection resistance which the fiber laser system 10 is expected to have, but the reference level is set to be, for example, −50 dB when processing is carried out.

CITATION LIST

Patent Literature

[Patent Literature 1]
Japanese Patent Application Publication, Tokukai, No. 2015-95641 A (Publication Date: May 18, 2015)

SUMMARY OF INVENTION

Technical Problem

However, when an FLU 20 is turned on, that is, when a power of a laser beam outputted from the FLU 20 starts to increase from 0, the power of the laser beam is greater than a power of a laser beam that is outputted from the FLU 20 during steady operation. As such, even if the fiber laser system 1 is designed so that a power of a Stokes beam relative to a power of the beam L10 is below the reference level during steady operation, the fiber laser system may, when the FLU 20 is turned on, fall in a state in which a Raman gain is high enough to allow a Stokes beam generated by SRS to destabilize an oscillation state of the FLU 20. This problem will be detailed below.

A fiber laser has a characteristic that in a case where time required by excitation light to rise is set short (in the order of $\mu$ sec), a power of a laser beam tends to have a large peak when the power of the laser beam rises. FIG. 12 is a graph showing a typical change over time in power of a laser beam outputted from an FLU 20 in a case where a laser diode used as an excitation light source is driven.

As shown in the graph, an output start time (approximately 1.00E-05 sec=approximately 10 $\mu$sec) at which the laser beam starts to be outputted is delayed from a driving start time (0 sec) at which the laser diode starts to be driven, and the power of the laser beam first has a sharp peak by reaching P1 and then is converged onto a set power P2. Note that a peak width is represented by a duration (time T1) corresponding to a half value of the peak P1.

Each of the three FLUs 20 illustrated in FIG. 11 outputs a laser beam whose power has a peak as shown in FIG. 12. As such, in a case where the FLUs 20 simultaneously start to be driven, a power of a laser beam outputted from the output combiner 30 has a peak larger than a peak of a power of a laser beam outputted from each FLU 20, since the peak of the power of the laser beam outputted from the output combiner 30 is obtained by overlapping the peaks of the powers of the laser beams outputted from the respective FLUs 20, as shown by the graphs inserted in FIG. 13. As a result, a power of light guided by each of the optical fibers significantly exceeds a power expected in designing the fiber laser system 10.

For example, in a case where each of the FLUs 20 has a peak P1 that is 1.5 times greater than a set power P2, light outputted from the output combiner 30 also has a peak P1 that is 1.5 times greater than a set power P2. That is, in a case where each of the FLUs 20 has a set power P2 of 1 kw and a peak P1 of 1.5 kw, the fiber laser system 10 in which the three fiber laser units 20 are provided in combination has a set power P2 of 3 kw and a peak P1 of 4.5 kw.

In this case, a Raman gain in the optical fiber f2 exceeds a level that causes a Stokes beam generated by SRS to destabilize the oscillation states of the FLUs 20. Accordingly, the oscillation states of the FLUs 20 are destabilized by mere reentrance, into the fiber laser system 1, of a component of a Stokes beam contained in the reflected light L11, that is, a reflected Stokes beam having a power smaller than a power that is allowable during steady operation. Thus, a level of reflection resistance of each of the FLUs 20 included in the fiber laser system 10 decreases from a level expected in designing the fiber laser system 10.

The present invention is accomplished in view of the foregoing problem. An object of the present invention is to provide a fiber laser system which has greater reliability when FLUs are turned on, as compared with a conventional technique.

Solution to Problem

In order to attain the object, a fiber laser system in accordance with an aspect of the present invention is a fiber laser system including:

(1) a plurality of fiber laser units including respective excitation light sources;

(2) a combiner for combining respective plurality of laser beams outputted from the plurality of fiber laser units;

(3) a plurality of current sources provided so as to correspond to the respective plurality of fiber laser units such that the plurality of current sources supply respective driving currents to corresponding ones of the excitation light sources; and (4) a control section for controlling the plurality of current sources so that there is a time interval of a certain time between adjacent peaks which appear in a case where respective powers of laser beams outputted from at least two fiber laser units of the plurality of fiber laser units rise.

Advantageous Effects of Invention

The present invention makes it possible to increase reliability of a fiber laser system which generates a laser beam obtained by combining a plurality of laser beams.

Figure 2:
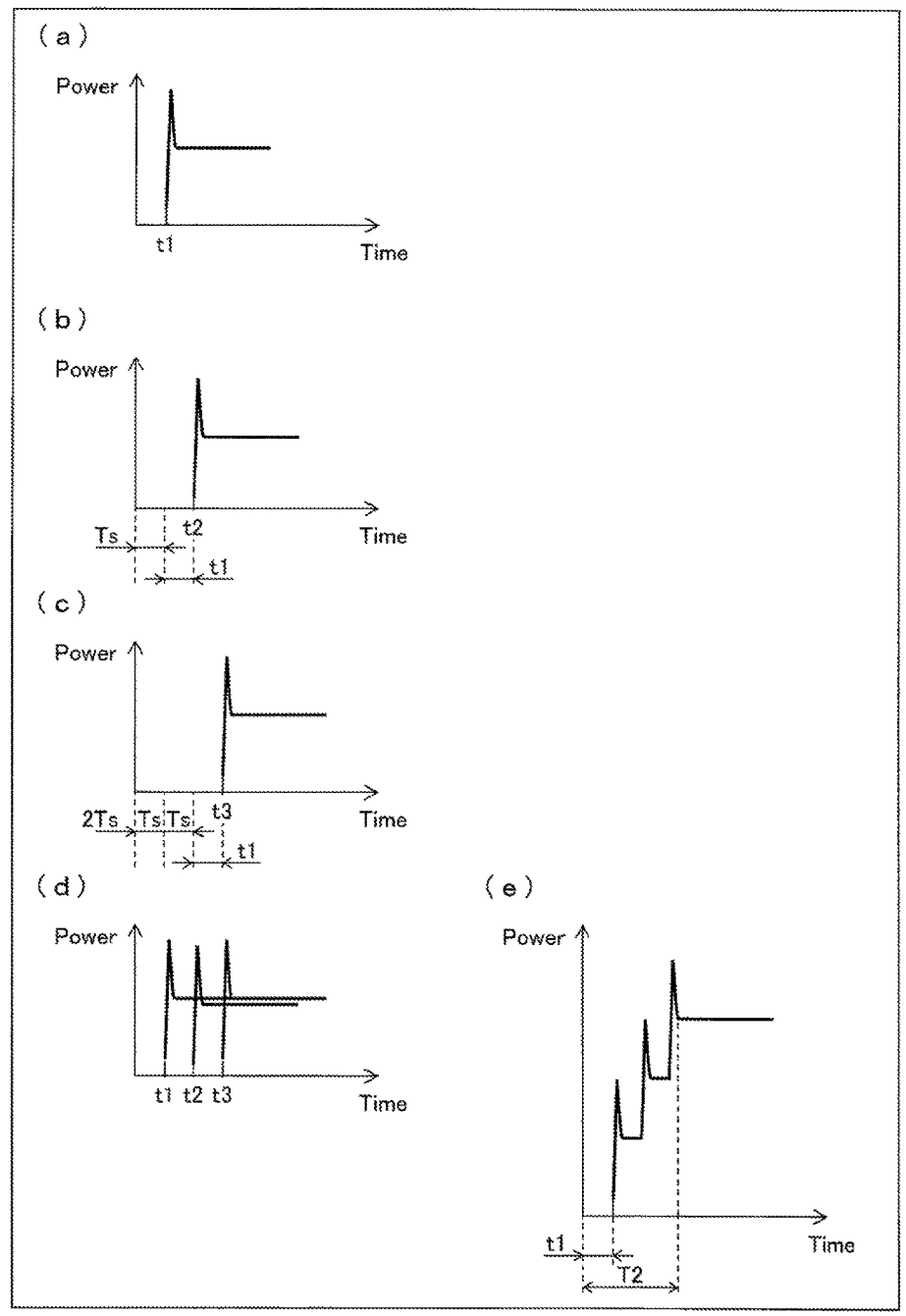

(a) through (e) of FIG. 2 are graphs showing changes over time in powers of a plurality of laser beams outputted from a plurality of laser beams sources included in the laser beam output system and in a power of a laser beam obtained by combining the plurality of laser beams.

Figure 3:
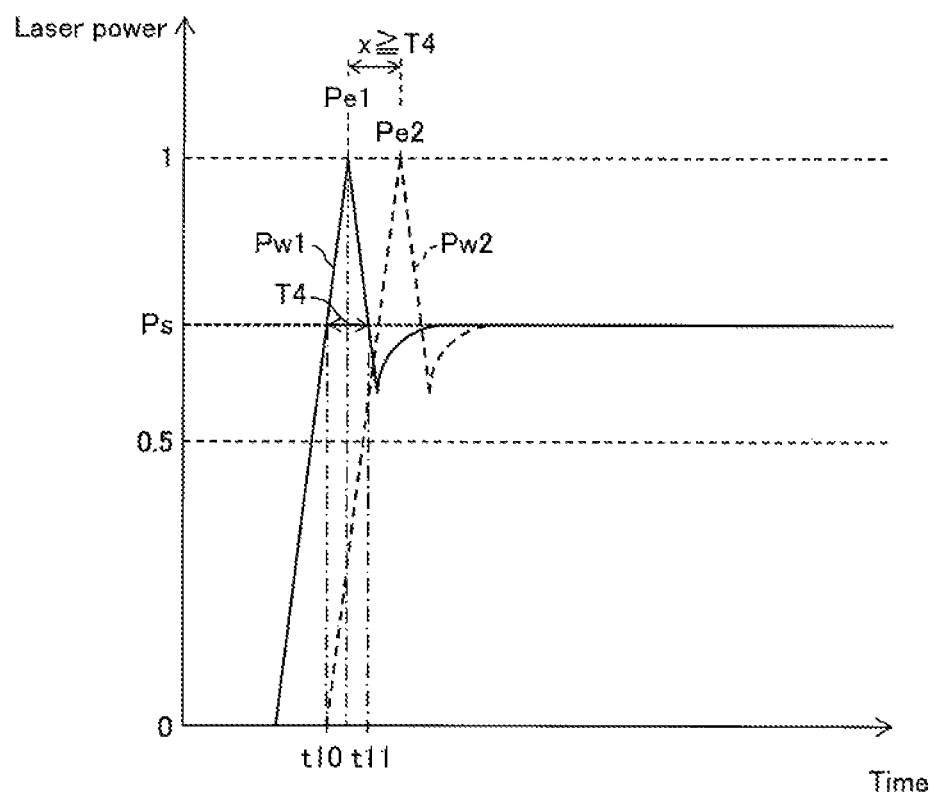

FIG. 3 is a graph descriptively showing a setting example in which a time interval (certain time) between two peaks appearing at respective times is set.

Figure 4:
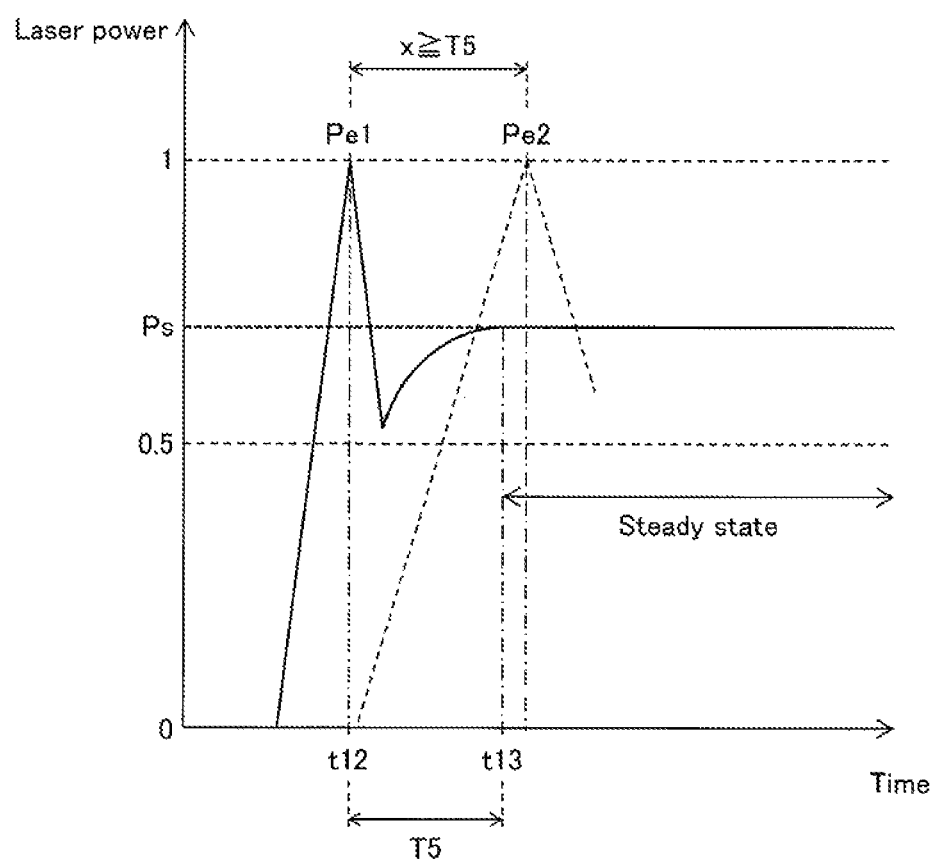

FIG. 4 is a graph descriptively showing another setting example in which a time interval (certain time) between two peaks appearing at respective times is set.

Figure 5:
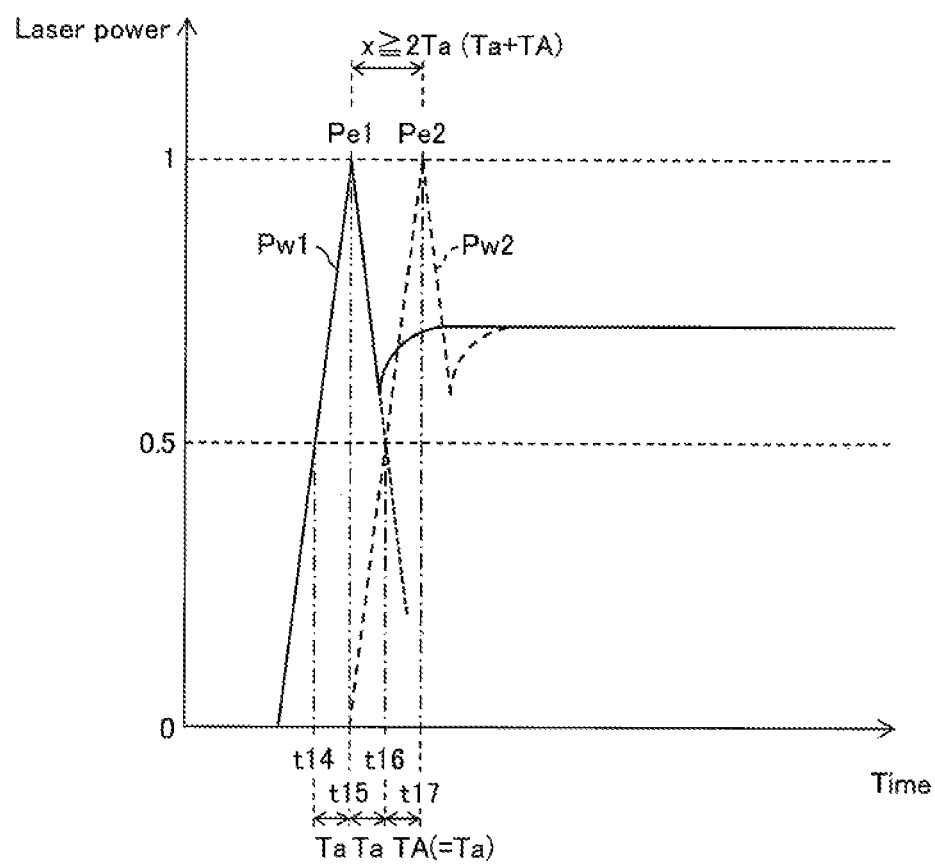

FIG. 5 is a graph descriptively showing yet another setting example in which a time interval (certain time) between two peaks appearing at respective times is set.

Figure 6:
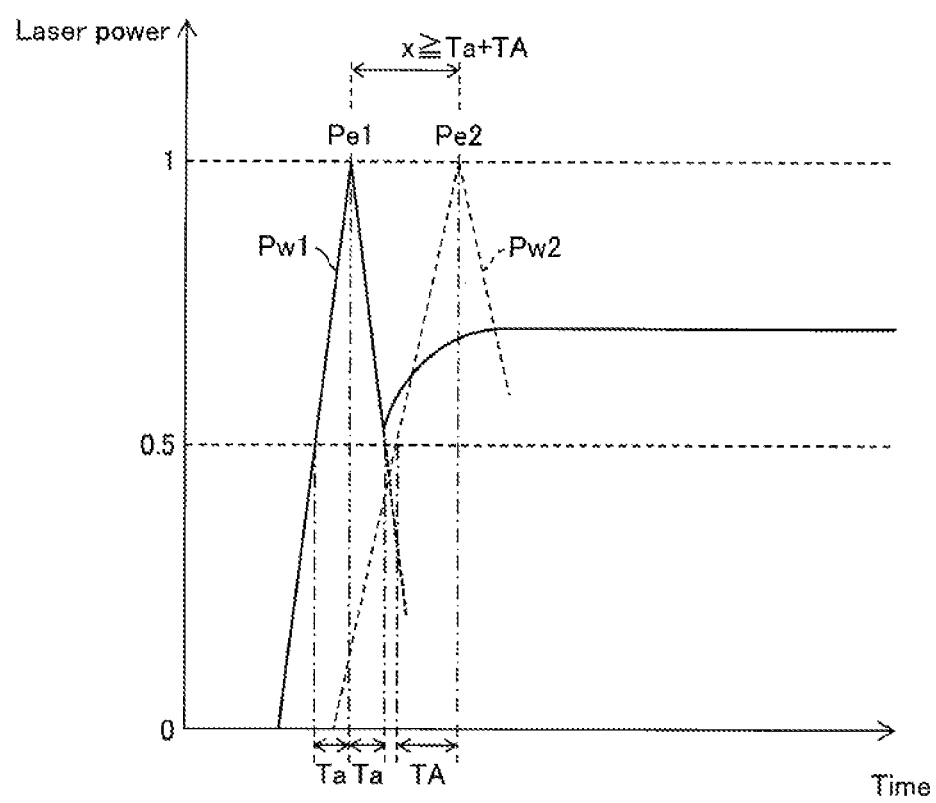

FIG. 6 is a graph illustrating a case where a peak appearing later than a peak appearing first has a greater width while the method of setting the time interval (certain time) illustrated in FIG. 5 is used.

Figure 7:
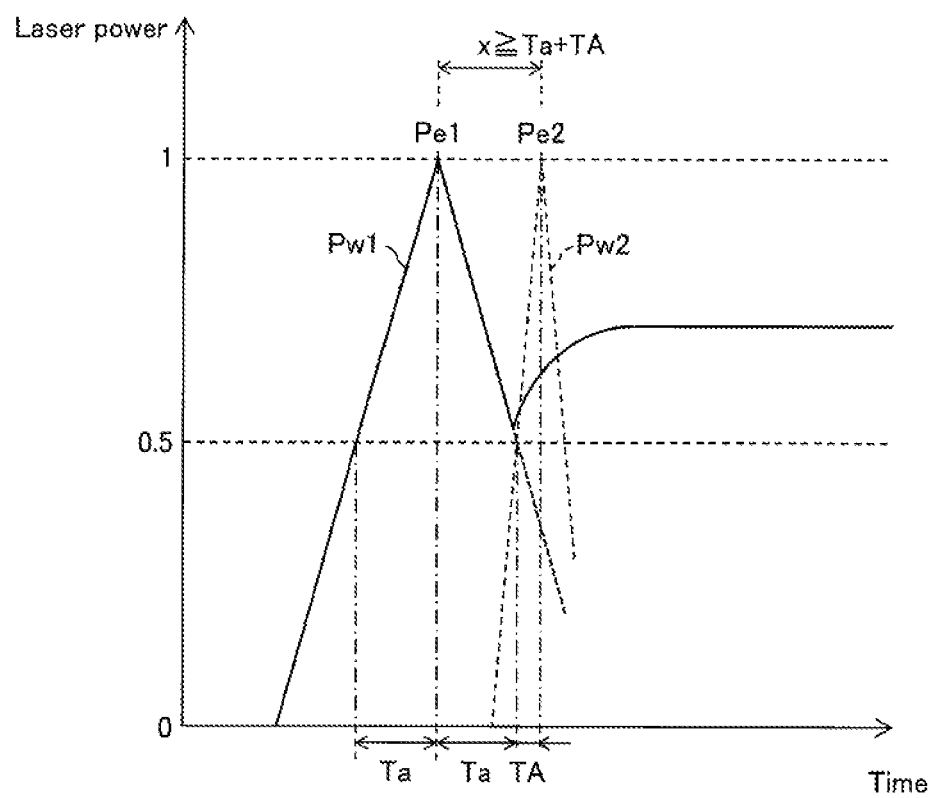

FIG. 7 is a graph illustrating a case where a peak appearing first has a greater width than a peak appearing later while the method of setting the time interval (certain time) illustrated in FIG. 5 is used.

Figure 1:
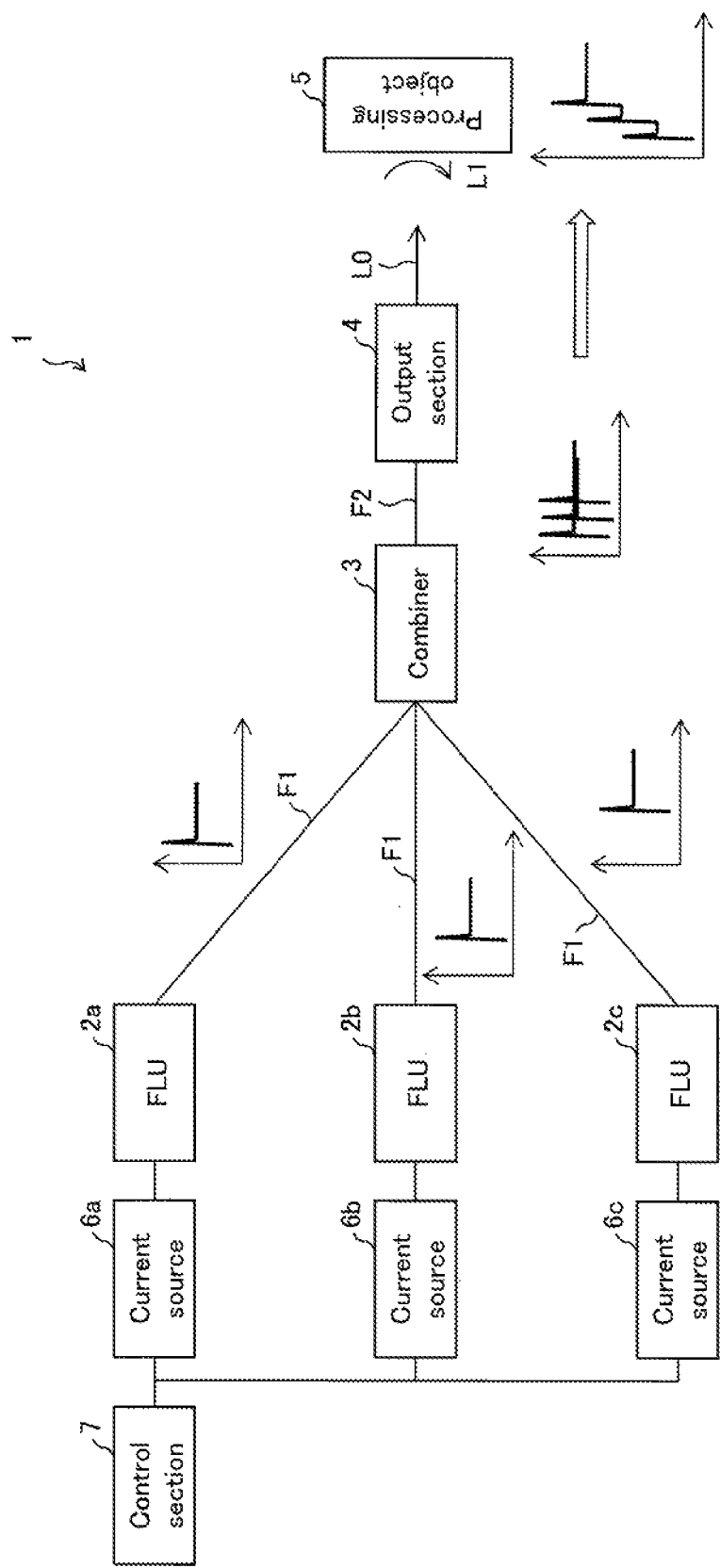
FIG. 1 is a block diagram descriptively illustrating a configuration example of a laser beam output system in accordance with an embodiment of the present invention.
Figure 8:
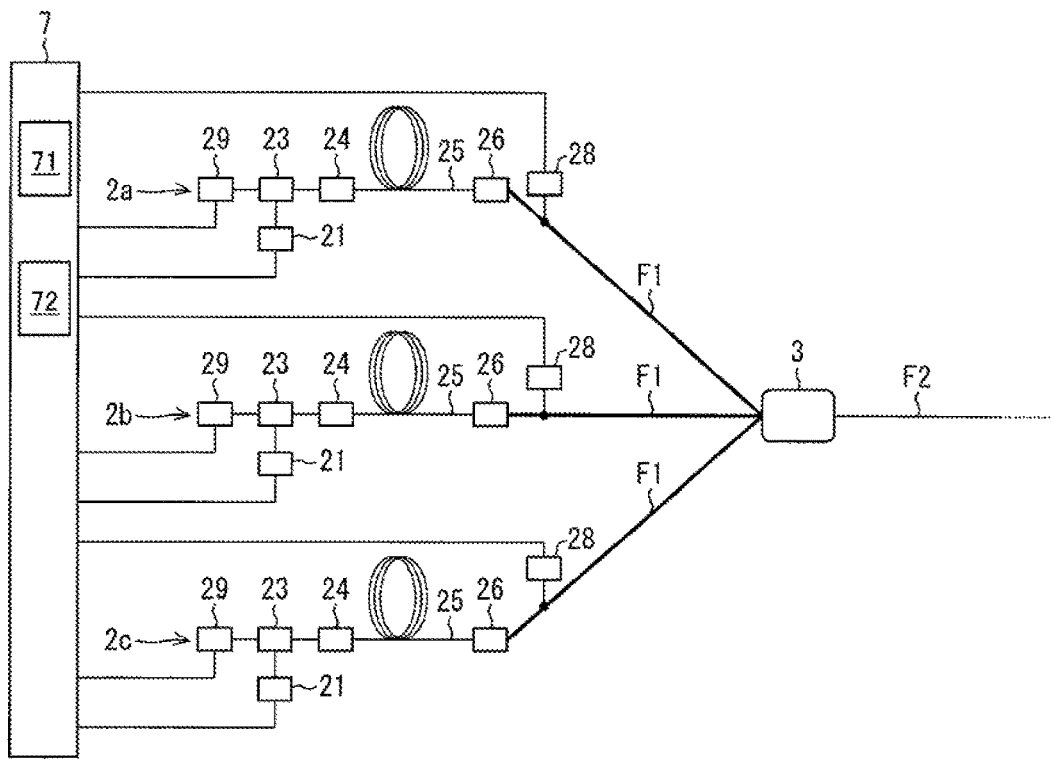

FIG. 8 is a view schematically illustrating fiber lasers of the fiber laser system illustrated in FIG. 1 and surrounding members.

Figure 9:
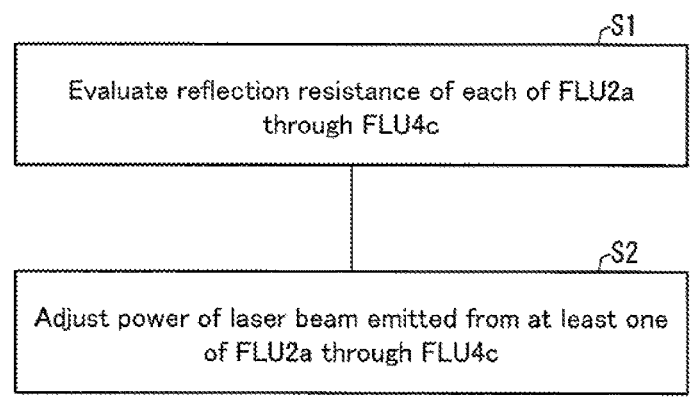

FIG. 9 is a flow chart showing a flow of a reflection resistance evaluating method and a reflection resistance increasing method carried out with the use of the fiber laser system illustrated in FIG. 1.

Figure 10:
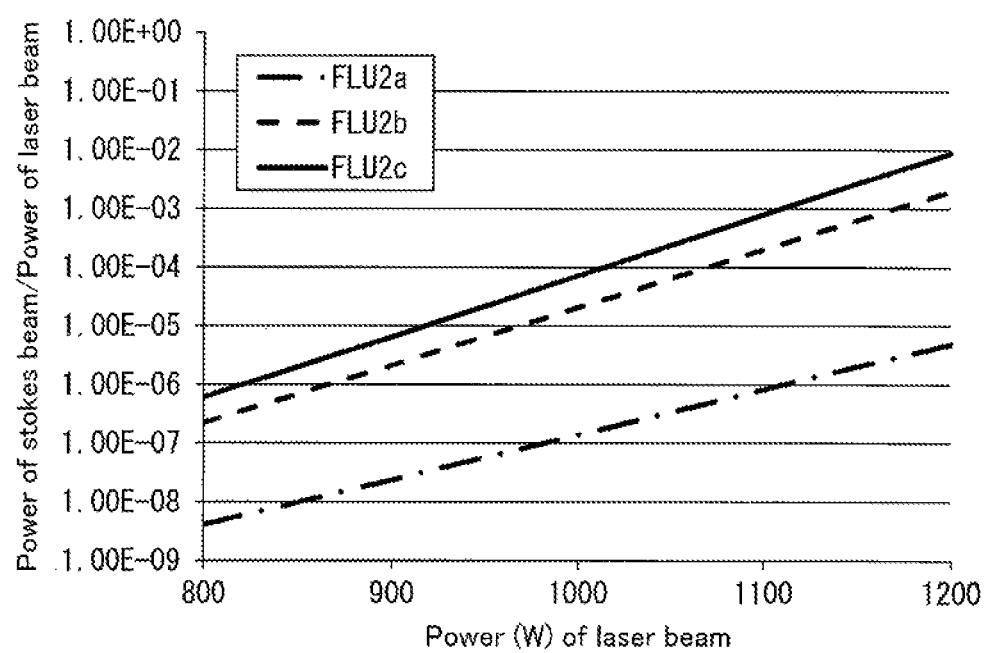

FIG. 10 is a graph showing an example of a relationship between (i) powers of laser beams emitted from fiber lasers included in the fiber laser system illustrated in FIG. 1 and (ii) power of Stokes beam/power of laser beam (reflection resistance).

Figure 11:
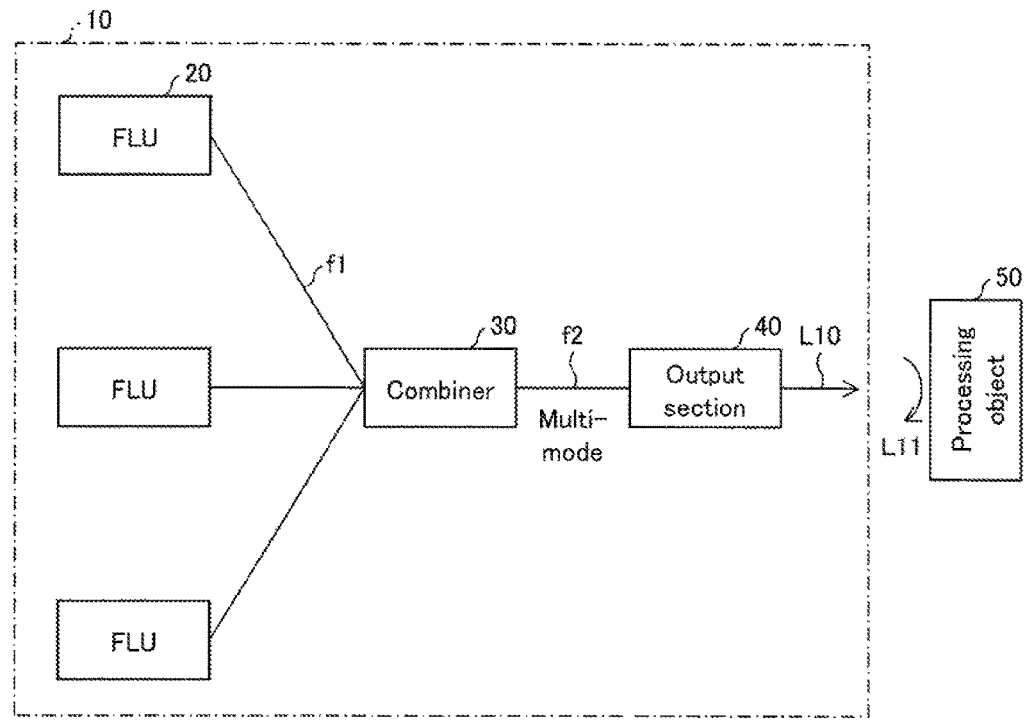

FIG. 11 is a block diagram illustrating a configuration of a conventional laser beam output system.

Figure 12:
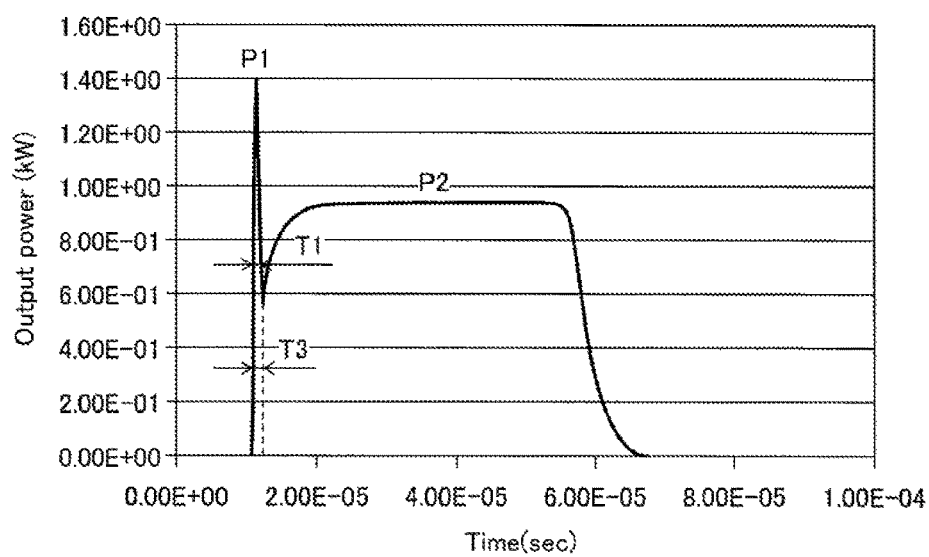

FIG. 12 is a graph showing details of a change over time in power of a laser beam outputted from a laser beam source included in each of laser beam output systems illustrated in respective FIGS. 1 and 11.

Figure 13:
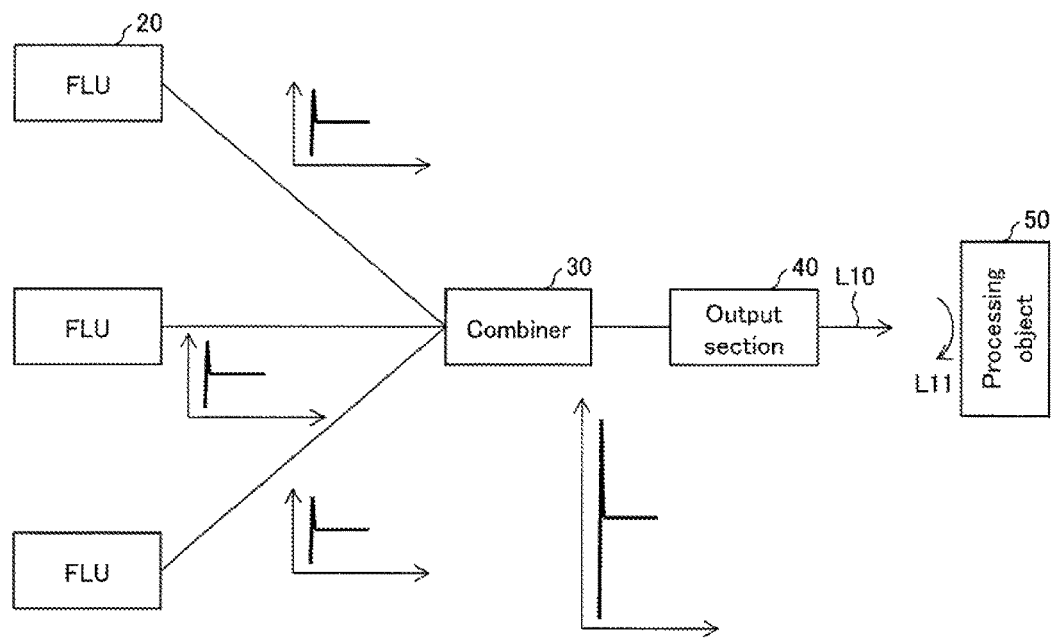

FIG. 13 is a view illustrating a change over time in (i) power of laser beams outputted from a respective plurality of laser beams sources included in the laser beam output system illustrated in FIG. 11 and (ii) power of a laser beam obtained by combining the plurality of laser beams.

DESCRIPTION OF EMBODIMENTS

[Embodiment 1]

(Configuration of Laser Beam Output System)

The following description will discuss, with reference to FIG. 1, a configuration example of a fiber laser system in accordance with an aspect of the present invention. FIG. 1 is a block diagram descriptively illustrating a configuration example of a fiber laser system 1 in accordance with Embodiment 1.

As illustrated in FIG. 1, the fiber laser system 1 includes (i) a plurality of fiber laser units (hereinafter referred to as "FLU") 2a, 2b, and 2c (laser beam sources), (ii) an output combiner 3 (combiner), (iii) an output section 4, (iv) optical fibers F1 and FIG. 2, (v) current sources 6a, 6b, and 6c, and (vi) a control section 7.

The FLUs 2a, 2b, and 2c generate and output respective plurality of laser beams to be combined by the output combiner 3. The FLUs 2a, 2b, and 2c can therefore be regarded as laser beam sources of the fiber laser system 1. In Embodiment 1, the FLUs 2a, 2b, and 2c are identical in configuration. Therefore, a configuration of the FLU 2a will be described below.

The FLU 2a is a laser unit in which a laser medium is an amplifying optical fiber having a core to which a rare earth element is added. The FLU 2a includes an exciting section, a resonator section, and an output section. The exciting section includes (i) a plurality of laser diodes (hereinafter referred to as "LD") and (ii) a combiner for collecting light beams which have been emitted from the respective LDs. The resonator section includes (i) an amplifying optical fiber and (ii) a mirror element and a half mirror element with which the amplifying optical fiber is sandwiched. The output section includes an output optical fiber.

Examples of a rare earth element to be added to the core encompass Er (erbium), Yb (ytterbium), and Nd (neodymium). The rare earth element added to the core of the amplifying optical fiber is transitioned to a population inversion state by excitation light beams supplied from the respective plurality of LDs. Then, the rare earth element thus transitioned to the population inversion state generates spontaneous emission light. Part of the spontaneous emission light, which part has a certain wavelength, is selectively reflected by the mirror element and the half mirror element. This causes the part of the spontaneous emission light having the certain wavelength to repeatedly go back and forth as a seed beam in the amplifying optical fiber, so that induced emission is repeated. This causes a laser beam to be generated and emitted from the half mirror element toward the output section.

The FLU 2a can emit a single-mode, high-power laser beam in a case where the amplifying optical fiber is, for example, a double-cladding fiber including (i) a core which has a small diameter and to which a rare earth element is added, (ii) a first cladding which has a large diameter and by which the core is surrounded, and (iii) a second cladding with which the first cladding is surrounded. Alternatively, the FLU 2a can emit a multi-mode laser beam. Alternatively, the FLU 2a can be configured to be a fiber laser unit of a bi-directional excitation type configured so that (i) the exciting section serves as a front exciting section provided on a mirror element-side of the resonator section, (ii) a rear exciting section is provide between the resonator section and the output section, and (iii) excitation light is supplied from the front exciting section and the rear exciting section to the resonator section.

The output combiner 3 is configured to (i) generate a multi-mode laser beam by combining, for example, single-mode laser beams which have (a) been emitted from the respective FLUs 2a, 2b, and 2c, (b) passed through respective optical fibers F1, and (c) entered the output combiner 3 and (ii) supply the multi-mode laser beam to the output section 4 via the optical fiber F2. A multi-mode is a suitable mode of a laser beam L0 outputted from the output section 4 in a case where a high-power laser beam having a large beam diameter is desired. A single mode is a suitable mode of the laser beam L0 in a case where a reduction in beam diameter is prioritized over a high power.

The output section 4 can include, for example, an optical isolator. The optical isolator (i) allows a light beam, which is traveling in a first direction toward a processing object 5 (object) (i.e. an object to be processed), to pass through the output section 4 and (ii) restricts a light beam which is traveling in a second direction opposite the first direction. Therefore, the optical isolator reduces the following problem: (i) a reflected Stokes beam included in reflected light L1 which has been reflected by the processing object 5 is returned to the amplifying optical fiber, (ii) a power of light guided through the amplifying optical fiber is increased, and (iii) a Raman gain of stimulated Raman scattering is increased. This allows an increase in reflection resistance of the fiber laser system 1.

The current sources 6a, 6b, and 6c are provided so as to correspond to the FLUs 2a, 2b, and 2c, respectively. The current sources 6a, 6b, and 6c supply driving currents to LDs included in each of the FLUs 2a, 2b, and 2c. The control section 7 controls (i) a size of a driving current supplied from each of the current sources 6a, 6b, and 6c to corresponding LDs and (ii) a timing with which each of the current sources 6a, 6b, and 6c start supplying the driving current to the corresponding LDs. In a case where a driving current is a pulse current, the control section 7 supplies, to each of the current sources 6a, 6b, and 6c, a control signal which changes a pulse height, a pulse width, and a pulse waveform of the pulse current.

(Laser Beam Outputting Method: 1)

An example in which the fiber laser system 1 emits a laser beam L0 toward the processing object 5 will be described with reference to FIG. 2 and FIG. 12 which was referred to in the description of the background art. (a) through (c) of FIG. 2 are graphs showing changes over time in powers of a plurality of laser beams outputted from the FLUs 2a, 2b, and 2c, respectively. (d) of FIG. 2 is a graph showing how peaks of the powers of the plurality of laser beams appear at respective times. (e) of FIG. 2 is a graph showing changes over time in the power of a laser beam L0, that is, a laser beam obtained by combining the plurality of laser beams.

As shown in (a) of FIG. 2, the FLU 2a emits a laser beam so that the power of the laser beam rises at time t1. Therefore, the control section 7 instructs the current source 6a to start driving. In response, the current source 6a starts supplying a driving current to the LDs of the FLU 2a. As described with reference to FIG. 12, the details of the changes over time of the power are: (I) there is a delay from (i) time 0 (driving start time) which is time at which the driving current starts to be supplied to (ii) time t1; (II) the power drastically rises; and (III) a sharp peak P1 is formed. Then, after the power drastically decreases, the power gradually increases so as to be converged onto a set power P2. Note that the time t1, which is delayed time, is a parameter determined by (i) the size of the driving current (pulse height in a case of a pulse current) and (ii) a characteristic of the resonator section of the FLU 2a. It is therefore possible to obtain the time t1 in advance by pre-measurement.

Then, the control section 7 instructs the current source 6b to start driving. In response, as shown in (b) of FIG. 2, the current source 6b starts supplying a driving current to the LDs of the FLU 2b at time (driving start time) which is a certain time Ts after the time 0. This causes the FLU 2b to emit a laser beam so that the power of the laser beam rises at time t2. In a case where the resonator section of the FLU 2b has a delay from (i) the time at which the driving current starts to be supplied to (ii) the time t1, the time t2 satisfies a relationship of t2=Ts+t1. Therefore, a certain time Ts can be decided in advance so that a length of time from time 0 to the time t2 is a desired length.

Then, the control section 7 likewise instructs the current source 6c to start driving. In response, as shown in (c) of FIG. 2, the current source 6c starts supplying a driving current to the LDs of the FLU 2c at time (driving start time) which is a time 2 Ts (equal to twice as long as the certain time Ts) after the time 0. This causes the FLU 2c to emit a laser beam so that the power of the laser beam rises at time t3. In a case where the resonator section of the FLU 2c has a delay from (i) the time at which the driving current starts to be supplied to (ii) the time t1, the time t3 satisfies a relationship of t3=2Ts+t1.

As shown in (d) of FIG. 2, after the FLU 2a thus emits the laser beam first at the time t1, the FLUs 2b and 2c emit the respective laser beams in turn with timings delayed by increments of the certain time Ts. Then, the respective plurality of laser beams emitted from the FLUs 2a, 2b, and 2c are combined by the output combiner 30 so as to be a multi-mode light beam having a power shown in (e) of FIG. 2, and emitted toward the processing object 5.

According to the laser beam outputting method in accordance with Embodiment 1, there are time intervals of the certain time Ts between timings with which the respective powers of the laser beams outputted from the FLUs 2a, 2b, and 2c rise. This allows the plurality of laser beams to be outputted while there are time intervals of the certain time Ts between the occurrences of the respective peaks of the plurality of laser beams. It is therefore possible to provide time intervals of the certain time between the peaks that appear in a case where the powers of the respective laser beams outputted from the FLUs 2a, 2b, and 2c rise. Therefore, in a case where a laser beam is to be generated by combining a plurality of laser beams, it is possible to prevent peaks of the respective powers of the plurality of laser beams from simultaneously appearing.

For example, in a case where a peak (p) of powers of laser beams outputted from the FLUs 2a, 2b, and 2c is 1.5 times greater than a set power, a peak (P) of a power of a laser beam outputted from the output combiner 3 is reduced to 1.17 times greater than the set power. Specifically, in a case where the set power of each of the FLUs 2a, 2b, and 2c is 1 kw and where the peak (p) is 1.5 kw in the fiber laser system 1, the set power and the peak (P) become 3 kw and approximately 3.5 kw, respectively.

Therefore, it is possible to avoid the following problem: the respective peaks of the powers of the light beams guided through the fiber laser system 1 simultaneously appear, and therefore a power of the fiber laser system 1 momentarily exceeds an upper limit of a power expected in designing the fiber laser system 1. Therefore, it is possible to prevent a size of Raman gain in the optical fiber F2 provided so as to follow the output combiner 3 from exceeding a level at which oscillation states of the FLUs 2a, 2b, and 2c become unstable. This improves reliability of the fiber laser system 1 when a power of a laser beam outputted from the fiber laser system 1 rises. Note that even in a case where part of reflected light L1 from the processing object 5 is returned into the fiber laser system 1, the peaks of the laser beams outputted from the FLUs 2a, 2b, and 2c and the peak of the reflected light L1 can be prevented from simultaneously appearing. This is because there are time intervals of the certain time Ts between timings with which the powers of the laser beams outputted from the FLUs 2a, 2b, and 2c rise.

Note that the certain time Ts is preferably equal to or greater than a time T1 (see FIG. 12) which is approximately a half-width of a peak that is at a greatest power (maximum peak) among all peaks appearing in a case where the respective powers of the FLUs 2a, 2b, and 2c rise. The reason for considering the maximum peak is because respective output characteristics of the FLUs 2a, 2b, and 2c are not necessarily identical. In a case where the respective output characteristics of the FLUs 2a, 2b, and 2c are identical, the time T1 can be decided according to the peak of the power of any of the FLUs 2a, 2b, and 2c. By setting the certain time Ts to a value equal to or greater than the time T1 which is approximately the half-width of the maximum peak, it is possible to prevent the plurality of peaks from overlapping each other. The time T1 is, for example, 1 μs to 5 μs.

Note that T2 is assumed to be a time required for a power of a laser beam to rise and to be converged, which laser beam is necessary for a process of processing the processing object 5 where the number of FLUs is M (M is an integer) (see (e) of FIG. 2). In this case, the certain time Ts is preferably set to a value less than a time obtained by dividing the time T2 by (M−1), that is, preferably satisfies a condition $T1 \leq Ts < T2/(M-1)$. In addition, since there is a delay between the driving start time and the time t1 at which a laser power rises, the certain time Ts more preferably satisfies a condition $T1 \leq Ts \leq (T2-t1)/(M-1)$.

In a case where the object is to be processed with the use of a laser beam, the time (T2) required for the power of the laser beam to rise and to be converged is approximately 20 μs to 30 μs. Then, M satisfying $5 \mu s \leq Ts \leq (30\mu s - 10\mu s)/(M-1)$ is M≤5, where (i) the T2 is 30 μs, (ii) the time t1 is 10 μs (see FIG. 12), and (iii) the time T1 corresponding to the half-width of the peak is 5 μs. It is therefore possible to increase the number of FLUs to 5.

Note that the above example described the method in which the control section 7 controls the current sources 6a through 6c so that there are time intervals of the certain time between the peaks appearing in a case where the respective powers of the laser beams outputted from all of the FLUs 2a, 2b, and 2c rise. Alternatively, the control section 7 can control the current sources 6a through 6c so that there is a time interval of the certain time between adjacent peaks appearing in a case where powers of laser beams outputted from at least two FLUs included in the plurality of FLUs rise. In such a case also, it is possible to prevent at least two peaks, of the plurality of peaks of the powers of the laser beams, from simultaneously appearing. This allows for restriction of an excessively large peak appearing in a case where a power of a laser beam, which is generated by combining the laser beams, rises.

(Variation)

Embodiment 1 described the example in which the time T1 is defined as a time which is approximately a half-width of the maximum peak among the peaks of the powers of the plurality of laser beams. Alternatively, it is possible to change a method of defining the time T1. For example, as illustrated in FIG. 12, it is possible to replace the time T1 with a time T3 which is approximately a difference between (i) time at which a power of a laser beam is at a minimum value after reaching a peak P1 and then drastically attenuates and (ii) time at which the power starts rising.

(Laser Beam Outputting Method: 2)

Embodiment 1 described the laser beam outputting method focusing on time at which a power of a laser beam rises. However, an alternative laser beam outputting method can be used in which the control section 7 controls the current sources 6a through 6c so that there are time intervals of a certain time between peaks which appear in a case where powers of respective laser beams outputted from the FLUs 2a, 2b, and 2c rise. A specific example of alternative laser beam outputting method will be described below with reference to FIGS. 3 through 7.

(Setting Example 1 in which Certain Time is Set)

FIG. 3 is a graph descriptively showing a setting example in which a time interval (certain time x) between two peaks appearing at respective times is set. Note that a vertical axis of FIG. 3 is normalized by values of peaks Pe1 and Pe2 described later. This also applies to vertical axes of FIGS. 4 through 7 described later.

As shown in FIG. 3, focus will be placed on powers Pw1 and Pw2 of two laser beams that are of three laser beams outputted from the FLUs 2a, 2b, and 2c, which powers Pw1 and Pw2 have respective peaks Pe1 and Pe2 that appear adjacently in time. The powers Pw1 and Pw2 are converged onto a steady level Ps after the peaks Pe1 and Pe2 appear. Of the two peaks Pe1 and Pe2 appearing at the respective times, the peak Pe1 is a first peak appearing first. The power Pw1 is a first power as a power of a laser beam having the first peak. Note that a T4 is defined as a length of time between (A) time t10 at which the power Pw1 having risen reaches the steady level Ps (first steady level) and (B) at time t11 at which the power Pw1 having reached the peak Pe1 attenuates to reach the steady level Ps again. In this case, the certain time x is to be set to be equal to or greater than the time T4. Specifically, the relevant two current sources of the current sources 6a through 6c are controlled by the control section 7 so that the certain time x is equal to or greater than the time T4. The time T4 can be decided in advance by measuring the time t10 and the time t11.

Hence, there is a time interval of, as the certain time x, equal to or greater than the time T4 between the two peaks Pe1 and Pe2 appearing adjacently in time. This makes it possible to reliably prevent the two peaks Pe1 and Pe2 from simultaneously appearing.

In FIG. 3, (i) the powers Pw1 and Pw2 rise in this order and (ii) respective waveforms of the powers Pw1 and Pw2 are identical. Note, however, that similarities in rising timings and waveforms between the powers are inessential. That is, any of the powers Pw1 and Pw2 can rise first, or the powers Pw1 and Pw2 can rise simultaneously (this will be hereinafter referred to as "non-restrictive condition 1" in regard to the timings of power rising). As long as x≤T4 is satisfied, each fiber laser unit can have its unique characteristics such as (i) a delay time from (a) a time point at which a current source is turned on to (b) at time point at which a power of a laser beam corresponding to the current source starts rising, (ii) a rate at which a power of a laser beam rises, (iii) a level of a peak to be reached, and (iv) a value of a steady level (this will be hereinafter referred to as "non-restrictive condition 2" in regard to the characteristics of the fiber laser units).

Setting example 1 described, as an example, the case where respective values of the peak Pe1 and the peak Pe2 are identical. Note, however, that according to the fiber laser system 1 in accordance with Embodiment 1 in which all of the setting examples described later are included, the respective values of the peak Pe1 and the peak Pe2 can differ, and the value of the peak Pe1 can be greater than the value of the peak Pe2 and vice versa.

(Setting Example 2 in which Certain Time is Set)

FIG. 4 is a graph descriptively showing another setting example in which a time interval (certain time x) between two peaks appearing at respective times is set. In Setting Example 2, a certain time x is defined only by a change over time in a power Pw1. As shown in FIG. 4, the power Pw1 rises, reaches a peak Pe1 at time t12, attenuates, and rises again, and is then converged onto the steady level Ps at time t13. In this case, the certain time x is to be set to a value equal to or greater than a time T5 where the T5 is an time interval between the time t12 and the time t13. In other words, the time T5 is a time from (i) a time point at which the power Pw1 reaches the peak Pe1 to (ii) a time point at which the power Pw1 is converged onto the steady level Ps.

As is the case of the typical change over time in power of the laser beam shown in FIG. 12, a comparison of the time T5 with the time T4 in Setting example 1 generally shows a relationship T5≥T4. Therefore, according to Setting example 2, a longer time interval between two peaks appearing at respective times can be secured. In FIG. 4, the power Pw2 rises later than the power Pw1, and the power Pw2 has a greater peak width (time required for the power to attenuate after rising and reaching the peak) than the power Pw1. Note, however, that the earlier-described non-restrictive conditions 1 and 2 also apply to Setting example 2.

(Setting Example 3 in which Certain Time is Set)

FIG. 5 is a graph descriptively showing another setting example in which a time interval (certain time) between two peaks appearing at respective times is set.

In Setting example 3, (i) respective characteristics of current sources 6a, 6b, and 6c can be assumed to be identical and (ii) respective characteristics of FLUs 2a, 2b, and 2c can be assumed to be identical. Therefore, the powers Pw1 and Pw2 can be assumed to be identical in terms of characteristics including: (i) a delay time from (a) a time point at which a corresponding current source is turned on to (b) a time point a powers rises, (ii) a rate at which the power rises, (iii) a level of each of the peaks Pe1 and Pe2 to be reached, (iv) a state in which the power attenuates from each of the peaks Pe1 and Pe2, rises, and is then converged onto the steady level, and (v) a value of the steady level.

In defining a certain time x, Setting example 3 focuses on a time from (a) a time point at which a power reaches a half value of a peak to (b) a time point at which the power reaches the peak. Specifically, the power Pw1 reaches a half value of the peak Pe1 at time t14, and then reaches the peak Pe1 at time t15. In this case, a time interval between the time t14 and the time t15 is defined as a Ta. The power Pw2 reaches a half value of the peak Pe2 at time t16, and then reaches the peak Pe2 at time t17. Therefore, a time interval between the time t16 and the time t17 is defined as a TA.

In this case, the certain time x is set to a value equal to or greater than a total time of the time Ta and the time TA in combination. That is, the certain time x is set so as to satisfy x≥Ta+TA. Note that since respective waveforms of the power Pw1 and the power Pw2 are congruent, Ta=TA in Setting example 3. Therefore, it can also be said that the certain time x is to be set to satisfy x≥2Ta.

In a case where the respective waveforms of the power Pw1 and the power Pw2 are congruent and where x=2Ta is satisfied, the power Pw2 rises at time at which the power Pw1 reaches the peak Pe1 as shown in FIG. 5. In Setting example 3, therefore, by satisfying x≥2Ta, the power Pw2 rises at or later than the time at which the power Pw1 reaches the peak Pe1. This prevents the level of the peak Pe1 from being affected by the power Pw2 at all, and therefore allows two peaks appearing adjacently in time to be reliably prevented from simultaneously appearing.

(Setting Example 4 in which Certain Time is Set)

Setting example 3 described the example in which the respective characteristics of the current sources 6a, 6b, and 6c are assume to be identical and the respective characteristic of the FLUs 2a, 2b, and 2c are assumed to be identical. Alternatively, the earlier-described non-restrictive conditions 1 and 2 can be applied while (i) x≥Ta+TA continues to be satisfied as in Setting example 3 and (ii) the characteristics are not identical. An example of such a case will be further described below as Setting example 4.

FIG. 6 is a graph illustrating a case where a peak appearing later than a peak appearing first has a greater width while the method of setting the time interval (certain time) illustrated in FIG. 5 is used. Since the peak Pe2 (second peak) is greater in width than the peak Pe1 (first peak), the earlier-described time TA is naturally longer than the time Ta. In this case also, by setting the certain time x to be equal to or greater than a total time of the time Ta and the time TA in combination, the certain time x can be set to be longer than that in Setting example 4. This allows two peaks appearing adjacently in time to be reliably prevented from simultaneously appearing.

(Setting Example 5 in which Certain Time is Set)

Setting example 4 described the example in which a peak appearing later than a peak appearing first has a greater width. Alternatively, a peak appearing first can have a greater width than a peak appearing later. Such a case will be described below as Setting example 5.

FIG. 7 is a graph illustrating a case where a peak appearing first has a greater width than a peak appearing later while the method of setting the time interval (certain time) illustrated in FIG. 5 is used. Since the peak Pe1 is greater in width than the peak Pe2, the earlier-described time Ta is naturally longer than the time TA. In this case also, by setting the certain time x to be equal to or greater than a total time of the time Ta and the time TA in combination, the certain time x can be set to be longer than that in Setting example 4. In addition, in Setting example 5, the power Pw2 rises at or later than the time at which the power Pw1 reaches the peak Pe1. This prevents the level of the peak Pe1 from being affected by the power Pw2 at all, and therefore allows two peaks appearing adjacently in time to be reliably prevented from simultaneously appearing.

[Embodiment 2]

In Embodiment 1, the driving start times are made different on the assumption that the respective sizes of driving currents supplied from the current sources 6a, 6b, and 6c to the LDs are identical. Meanwhile, the control section 7 can drive the current sources 6a, 6b, and 6c so that sizes (pulse heights in a case of pulse currents) of driving currents supplied from the current sources 6a, 6b, and 6c to LDs become different. Such control is based on the following principle: The larger a size of a driving current, the earlier a power of a laser beam outputted from an LD rises, that is, time at which a peak of a larger power of a laser beam appears earlier than time at which a peak of a smaller power of a laser beam appears.

It is possible to measure in advance a relationship between (i) a size of a driving current and (ii) time at which a power of a laser beam outputted from an LD rises. Therefore, the control section 7 can control the current sources 6a, 6b, and 6c so that there are time intervals of the certain time Ts between times at which respective peaks of powers of laser beams outputted from the FLUs 2a, 2b, and 2c appear. More specifically, the control section 7 can control the current sources 6a, 6b, and 6c so that respective driving currents supplied from the current sources 6a, 6b, and 6c can become smaller and smaller in this order.

[Embodiment 3]

The following description will describe a method of deciding an order in which FLUs 2a, 2b, and 2c start to be driven in a case where (i) a difference in probability of the occurrence of the above-described SRS (stimulated Raman scattering) between the FLUs 2a, 2b, and 2c is evaluated and (ii) time intervals of the certain time Ts are provided, according to results of the evaluation, between respective timings with which the FLUs 2a, 2b, and 2c are driven.

The inventor of the present invention has found that in a case where SRS occurs in any one of the FLUs 2a, 2b, and 2c, (i) a Stokes beam, which is guided through the FLU in which the SRS occurred, enters another FLU as a result of, for example, Rayleigh scattering and/or Fresnel reflection in, for example, the output combiner 3 and/or the optical fiber F2 or (ii) a Stokes beam, which has been reflected by the processing object 5 and returned into the fiber laser system 1, enters another FLU via, for example, the output combiner 3. This causes a power of light to become a seed beam of a Stokes beam in the another FLU, to be large, and, consequently, causes SRS to occur in all of the FLUs 2a, 2b, and 2c. Therefore, in order to achieve a fiber laser system having high reflection resistance as a whole (i.e. oscillation at a wavelength of a Stokes beam caused by SRS is unlikely to occur), it is necessary to (i) evaluate respective reflection resistances of the FLUs 2a, 2b, and 2c and (ii) control a lowest reflection resistance (i.e. which is likely to cause the oscillation) of a corresponding FLU to be increased approximately to levels of the other reflection resistances of the other FLUs.

In order to carry out such control, it is necessary to evaluate the respective reflection resistances of the FLUs (FLUs 2a, 2b, and 2c). Note, however, that reflection resistances that should be evaluated are reflection resistances of FLUs while the entire fiber laser system 1 is operating. This is because the oscillation that occurs in each of the FLUs of the fiber laser system 1 is, as described above, a phenomenon in which Stokes beams generated in the other FLUs are involved. A fiber laser system 1 having high reflection resistance is difficult to achieve as long as, as are the cases of conventional evaluating methods, a reflection resistance of a FLU is evaluated independently apart from the fiber laser system 1.

The following description will discuss Embodiment 3 in detail. The optical fibers F1 for connecting the FLUs 2a, 2b, and 2c to the output combiner 3 (see FIG. 1) are each a single-mode (or so-called pseudo-single-mode) optical fiber. The optical fiber F2 for connecting the output combiner 3 and the output section 4 is a silica glass multi-mode fiber. Each of these optical fibers generally has a reflectance of approximately $10^{-5}$% per meter. Recursive amplification of a Stokes beam occurs because of (i) light guided through the fiber laser system 1 and (ii) reflected light which has been returned from the processing object 5 to be processed with the use of a laser beam obtained by combining the plurality of laser beams. This results in notable oscillation at a wavelength of the Stokes beam caused by SRS. Then, the generation of the oscillation causes an increase in power of a Stokes beam which occurs because of a laser beam entering the silica glass.

FIG. 8 is a view schematically illustrating the FLUs 2a through 2c and surrounding members. Since the FLUs 2a through 2c are identical in configuration, the FLU 2a will be described below. As illustrated in FIG. 8, the FLU 2a is connected to the output combiner 3 via a corresponding one of the optical fibers F1, and includes (i) an excitation light source (light-emitting device) 21, (ii) a pump combiner 23, (iii) an amplifying optical fiber 25, (iv) a high-reflective FBG (Fiber Bragg Grating) 24 serving as a mirror, (v) a low-reflective FBG 26 serving as a half mirror, (vi) a laser beam measuring section 28, and (vii) a Stokes beam measuring section 29. The FLU 2a serves as a resonator-type fiber laser in which a part of the amplifying optical fiber 25 which part is sandwiched between the high-reflective FBG (mirror) 24 and the low-reflective FBG (half mirror) 26 is a resonator. As is the case of the optical fiber F2 which is a multi-mode fiber, the amplifying optical fiber 25 and the optical fiber F1 each have a core made of silica glass. The core allows a laser beam to propagate.

An optical fiber, which makes a connection from the pump combiner 23 through the amplifying optical fiber 25, can be similar in configuration to the amplifying optical fiber 25. Note, however, that no active element is added to a core of the optical fiber which makes the connection from the pump combiner 23 through the amplifying optical fiber 25.

The amplifying optical fiber 25 is a double-cladding fiber having a core to which an active element (e.g. rare earth element) is added. The high-reflective FBG 24 is provided at one end part of the amplifying optical fiber 25. The low-reflective FBG 26 is provided at the other end part of the amplifying optical fiber 25. The high-reflective FBG 24 is configured to reflect a laser beam generated by the amplifying optical fiber 25. A reflectance of the high-reflective FBG 24 at a lasing wavelength of a laser beam is, for example, 99% or more. The low-reflective FBG 26 is configured to (i) reflect part of a laser beam generated by the amplifying optical fiber 25 and (ii) allow a remaining part of the laser beam to pass through the low-reflective FBG 26. A reflectance of the low-reflective FBG 26 at a lasing wavelength of a laser beam is set to be lower than the reflectance of the high-reflective FBG 24, and is, for example, 10%. The excitation light source 21 is a light source of excitation light to be supplied to the amplifying optical fiber 25. The excitation light source 21 is connected to the amplifying optical fiber 25 via the pump combiner 23.

According to the FLU 2a, excitation light emitted from the excitation light source 21 enters a first cladding of the amplifying optical fiber 25 via the pump combiner 23. Then, when the excitation light guided through the first cladding of the amplifying optical fiber 25 passes through the core, the excitation light causes the active element, which has been added to the core, to be transitioned to a population inversion state. The active element thus transitioned to the population inversion state triggers a chain reaction of induced emission while spontaneous emission light serving as a seed beam. A laser beam generated by the induced emission is recursively amplified by being repeatedly reflected between the high-reflective FBG 24 and the low-reflective FBG 26.

The laser beam measuring section 28 is provided between the low-reflective FBG 26 and the output combiner 3, and measures a power included in an output from the amplifying optical fiber 25 toward the low-reflective FBG 26 (i.e. power of a laser beam passing through the low-reflective mirror).

The Stokes beam measuring section 29 measures a power of a Stokes beam which occurs due to laser beams simultaneously emitted from the respective FLUs 2a through 2c and which propagates in the FLU 2a. The Stokes beam measuring section 29 is provided toward a side opposite a side toward the amplifying optical fiber 25 when viewed from the high-reflective FBG 24 (i.e. toward the side of the mirror opposite the outputting side). The Stokes beam measuring section 29 measures a power included in an output from the FLU 2a toward the high-reflective FBG 24 (i.e. power of a Stokes beam passing through the high-reflective mirror).

The control section 7 includes a computing section 71 and a control processing section 72. Based on the results of the measurement carried out by the laser beam measuring section 28 and the results of the measurement carried out by the Stokes beam measuring section 29, the computing section 71 calculates a ratio of (i) the power of the Stokes beam which passed through the high-reflective FBG 24 to (ii) the power of the laser beam which passed through the low-reflective FBG 26. The control processing section 72 controls a maximum value of the ratio with respect to each of the FLUs 2a through 2c to be decreased by (i) selecting at least one fiber laser from the FLUs 2a through 2c, which at least one fiber laser has a highest value of the ratio and (ii) carrying out power down control to decrease the power of the laser beam emitted from the fiber laser thus selected.

The control processing section 72 adjusts the power of the laser beam with respect to each of the FLUs 2a through 2c by adjusting an electric current to be supplied to the excitation light source 21 which emits excitation light. This allows the power of the laser beam to be easily adjusted.

The following description will discuss a reflection resistance evaluating method of evaluating a reflection resistance of the FLU 2a with the use of the laser beam measuring section 28 and the Stokes beam measuring section 29. The reflection resistance (i.e. unlikelihood of the occurrence of oscillation at a wavelength of a Stokes beam caused by SRS) of the FLU 2a while the entire fiber laser system 1 is operating (i.e. while the FLUs 2a through 2c have simultaneously emitted respective laser beams) can be obtained by a ratio of results of measurement carried out by the Stokes beam measuring section 29 to results of measurement carried out by the laser beam measuring section 28. Note that a reflection resistance of a fiber laser is a ratio of a power of a Stokes beam propagating in the fiber laser to a power of a laser beam emitted from the fiber laser. In a case where the ratio is small (i.e. a power of a Stokes beam is small) because of a reason described below, the reflection resistance of a fiber laser can be considered high. That is, if the power of the Stokes beam is small with respect to the power of the laser beam, then it means that (i) a Raman gain with respect to a power of a given laser beam (i.e. degree to which energy is transferred from a laser beam to a Stokes beam) is small and (ii) loss of the Stokes beam is large. That is, in a case where a laser beam is returned from the processing object 5 with a given reflectance, oscillation is unlikely to occur because a threshold of the oscillation is high. Note that in a case where a power of a Stokes beam is amplified because of oscillation, the following expression is true: Raman gain $G \propto \exp$ (power of laser beam × length of fiber/effective core area of the fiber). Therefore, an increase in the power of the laser beam causes a Raman gain to be large, so that oscillation occurs even in a case of a small reflectance. This causes the oscillation of the laser beam to be unstable. Therefore, in a case where the ratio is small, the reflection resistance of a fiber laser can be considered high. In a case where the reflection resistances of the FLUs 2a, 2b, and 2c differ in the fiber laser system 1, the reasons for the difference are, for example, (i) differences in length or loss of the amplifying optical fiber 25 or the optical fiber F1 and (ii) differences in branching ratio or loss a laser beam at the output combiner 3. In other words, the reflection resistance of the FLU 2a can be obtained by a solution of (the results of measurement carried out by the Stokes beam measuring section 29)/(the results of measurement carried out by the laser beam measuring section 28). It can be said that the smaller the ratio (solution), the higher the reflection resistance of the FLU 2a.

In a case where a Stokes beam is large with respect to a laser beam, it means that a Raman gain is large with respect to the laser power (transfer of a power from the laser beam to the Stokes beam is large), that is, loss of the Stokes beam is small. Specifically, in a case where a power is returned from an object with a given reflectance, a gain of a Stokes beam can easily be equal to or greater than a loss of the Stokes beam. This means that a threshold of oscillation is low, and that the oscillation can therefore easily occur. That is, it can be said that the oscillation at a wavelength of the Stokes beam caused by SRS can easily occur, and that the reflection resistance is low.

For example, a power as a result of measurement carried out by the laser beam measuring section 28, that is, the power of a laser beam emitted from the FLU 2a is 1 kW. Then, for example, a power as a result of measurement carried out by the Stokes beam measuring section 29, that is, the power of a Stokes beam propagating in the FLU 2a while the entire fiber laser system 1 is operating is 0.00014 W. In so doing, with the use of the computing section 71, it is possible to determine that the reflection resistance of the FLU 2a while the entire fiber laser system 1 is operating is $0.00014/1000=1.4\times10^{-7}$.

The laser beam measuring section 28 and the Stokes beam measuring section 29 can each include a filter member for blocking light having a frequency other than a desired frequency. More specifically, it is possible that in each of the FLUs 2a through 2c, (i) the laser beam measuring section 28 includes a wavelength selection filter for selectively letting through light having a lasing wavelength of the corresponding one of the FLUs 2a through 2c and (ii) the Stokes beam measuring section 29 includes a wavelength selection filter for selectively letting through light having a wavelength obtained by adding, to the lasing wavelength of the corresponding one of the FLUs 2a through 2c, a wavelength corresponding to a Raman shift. This allows the laser beam measuring section 28 and the Stokes beam measuring section 29 to accurately measure a laser beam and a Stokes beam, respectively.

Note that in the fiber laser system 1, the reflection resistances of the FLUs 2b and 2c can be evaluated by a reflection resistance evaluating method similar to that by which the reflection resistance of the FLU 2a is evaluated. By evaluating the reflection resistance of each of the FLUs 2a through 2c by the above-described reflection resistance evaluating method, the reflection resistance evaluating method of evaluating the reflection resistance of the fiber laser system 1 can be achieved.

In each of the FLUs 2a through 2c, it can be said that the larger the ratio, the more easily SRS occurs. By causing the computing section 71 to obtain the ratio, it is possible to quantitatively evaluate the probability of the occurrence of SRS in each of the FLUs 2a through 2c while the entire fiber laser system 1 is operating.

The following description will discuss, with reference to FIG. 10, a reflection resistance increasing method of increasing a reflection resistance of the fiber laser system 1 with the use of the FLUs 2a through 2c. FIG. 10 is a graph showing an example of a relationship between (i) powers of laser beams emitted from fiber lasers 2 through 4 and (ii) power of Stokes beam/power of laser beam (reflection resistance). First, respective reflection resistances of the FLUs 2a through 2c while the entire fiber laser system 1 is operating are evaluated.

Note that a power of a laser beam emitted by the fiber laser system 1 is assumed to be 3 kW. Note also that at time before the reflection resistance of the fiber laser system 1 is increased, a power of a laser beam emitted from each of the FLUs 2a through 2c (as shown by the results of measurement of the FLUs 2a through 2c carried out by the laser beam measuring section 28) is assumed to be 1 kW. Note also that at the time before the reflection resistance of the fiber laser system 1 is increased and while the entire fiber laser system 1 is operating, respective powers of Stokes beams propagating in the FLUs 2a through 2c (as shown by the results of measurement of the FLUs 2a through 2c carried out by the Stokes beam measuring section 29) are assumed to be 0.00014 W (FLU 2a), 0.02 W (FLU 2b), and 0.072 W (FLU 2c).

With the use of the computing section 71, the respective reflection resistances of the FLUs 2a through 2c while the entire fiber laser system 1 is operating are determined to be $0.00014/1000=1.4\times10^{-7}$ (FLU 2a), $0.02/1000=2\times10^{-5}$ (FLU 2b), and $0.072/1000=7.2\times10^{-5}$ (FLU 2c). In this case, because of the reason described below, there is a risk that the respective reflection resistance of the FLU 2a and 2b may deteriorate to approximately $7.2\times10^{-5}$ due to the fact that the reflection resistance of the FLU 2c is lower than each of the reflection resistance of the FLU 2a and the reflection resistance of the FLU 2b. That is, in a case where a power of a Stokes beam caused by SRS becomes notable in the FLU 2c having a low reflection resistance, the Stokes beam is guided, via the output combiner 3, to the FLUs 2a and 2b each having a high reflection resistance. Consequently, in of the FLUs 2a and 2b each having a high reflection resistance, as with the FLU 2c having a low reflection resistance, oscillation at a wavelength of a Stokes beam caused by SRS occurs and therefore laser oscillation becomes unstable. In Embodiment 3, the concept of a "fiber laser having a high reflection resistance" means that it is merely possible to maintain a small power of a Stokes beam. Therefore, in a case where a power of a Stokes beam in a "fiber laser having a high reflection resistance" is forced to become large by a "fiber laser having a low reflection resistance", such an increase in the power of the Stokes beam can be considered similar to deterioration of the reflection resistance in the "fiber laser having a high reflection resistance".

Note that the larger the powers of laser beams emitted from the FLUs 2a through 2c, the lower (worse) the respective reflection resistances of the FLUs 2a through 2c become. The smaller the powers of laser beams emitted from the FLUs 2a through 2c, the higher (better) the respective reflection resistances of the FLUs 2a through 2c become. This is because a power of a Stokes beam caused by SRS increases exponentially with respect to a power of a laser beam. In addition, the respective powers of laser beams emitted from all of the FLUs 2a through 2c do not need to be equal. That is, although the power of the laser beam emitted from the fiber laser system 1 needs to be 3 kW, the powers of the laser beams emitted from the FLUs 2a through 2c do not need to be uniformly 1 kW.

Therefore, according to the fiber laser system 1, the control processing section 72 at least controls a power of a laser beam emitted from the FLU 2c, which has the highest value of the ratio (i.e. having the lowest reflection resistance), to be small (power down control) so that the maximum value of the ratios of the FLUs 2a through 2c is reduced. This allows for an increase in an overall reflection resistance of the entire fiber laser system 1.

According to the graph of FIG. 10, for example, the control processing section 72 is assumed to control the powers of the laser beams emitted from the FLUs 2a through 2c to be 1.185 kW, 0.93 kW, and 0.885 kW, respectively, so as to increase the reflection resistance of the fiber laser system 1. This uniformly causes the respective reflection resistances of the FLUs 2a through 2c to be approximately $4\times10^{-6}$, so that it is possible to prevent the occurrence of one of the reflection resistances of the FLUs 2a through 2c being extremely low. This prevents deterioration of the reflection resistances of all of the FLUs 2a through 2c from occurring, and therefore allows for an increase in the reflection resistance of the fiber laser system 1. In so doing, (i) the power of the laser beam emitted from the FLU 2a (unselected fiber laser) is made large (power up control) and (ii) the powers of the laser beams emitted from the FLUs 2b and 2c (selected fiber lasers) are made small (power down control). However, after the adjustment of a power balance, the reflection resistance of the FLU 2a and the reflection resistance of the FLU 2b are prevented from becoming lower than the reflection resistance of the FLU 2c before the adjustment of the power balance. This allows for an improvement in reflection resistance of the entire system while a reduction in power of the entire system is restricted. In a case where it is unnecessary to restrict the reduction in the power of the entire system, the power up control can be omitted.

Furthermore, the respective reflection resistances of the FLUs 2a through 2c (approximately $4 \times 10^{-6}$ in this example) do not need to be uniform. That is, the control processing section 72 can adjust the powers of the laser beams emitted from the FLUs 2a through 2c so that the respective reflection resistances of the FLUs 2a through 2c become equal to or greater than a certain value. In this case, a certain value can be set to greater than $4 \times 10^{-6}$ and less than $7.2 \times 10^{-5}$, and the ratio in each of the FLUs 2a through 2c can be made equal to or less than the certain value. In other words, it is possible to carry out power down control to (i) select one(s) of the FLUs 2a through 2c, which one(s) has/have the ratio that exceeds a predetermined value (certain value) and (ii) reduce the power(s) of the laser beam(s) emitted from the selected one(s). In this case also, it is possible to prevent deterioration of the reflection resistances of all of the FLUs 2a through 2c from occurring, and therefore allows for an increase in the reflection resistance of the fiber laser system 1.

According to the fiber laser system 1, it is possible to evaluate the probability of the occurrence of SRS in each of the FLUs 2a through 2c in accordance with a relationship between the results of measurement carried out by the laser beam measuring section 28 and the results of measurement carried out by the Stokes beam measuring section 29. This makes it possible to evaluate the probability of the occurrence of SRS in each of the FLUs 2a through 2c while the entire fiber laser system 1 is operating.

The FLUs 2a through 2c are identical in configuration. In other words, the arrangement of the Stokes beam measuring section 29 relative to the fiber laser is identical among the FLUs 2a through 2c. This allows the powers of the Stokes beams to be measured under the same conditions in each of the FLUs 2a through 2c.

FIG. 9 is a flow chart showing a flow of the reflection resistance evaluating method and the reflection resistance increasing method carried out in the fiber laser system 1 particularly with the use of the control processing section 72. Note that for simplicity of the description, FIG. 9 shows steps after the following steps have ended: (i) the step of measuring, by the laser beam measuring section 28, a power of a laser beam in an output at a low-reflective FBG 26-side in each of the FLUs 2a through 2c (laser beam measuring step) and (ii) the step of measuring, by the Stokes beam measuring section 29, a power of a Stokes beam in an output at a high-reflective FBG 24-side in each of the FLUs 2a through 2c (Stokes beam measuring step).

First, the computing section 71 evaluates a reflection resistance of a fiber laser in each of the FLUs 2a through 2c by calculating a ratio of a power of a Stokes beam having passed through the high-reflective FBG 24 to a power of a laser beam having passed through the low-reflective FBG 26, based on the results of measurement carried out by the laser beam measuring section 28 and the results of measurement carried out by the Stokes beam measuring section 29 (step S1: evaluating step).

Then, the control processing section 72 adjusts the powers of the laser beams emitted from the FLUs 2a through 2c. Specifically, the control processing section 72 controls a maximum value of the ratio with respect to each of the FLUs 2a through 2c to be decreased by (i) selecting at least one fiber laser from the FLUs 2a through 2c, which at least one fiber laser has a highest value of the ratio and (ii) carrying out power down control to decrease the power of the laser beam emitted from the fiber laser thus selected (step S2: power adjusting step).

The fiber laser system 1 is configured to include the laser beam measuring section 28 and the Stokes beam measuring section 29 in each of the FLUs 2a through 2c. Note, however, that this configuration is not necessary. That is, any one(s) of the FLUs 2a through 2c, which any one(s) does/do not need to be considered for reflection resistance increase and reflection resistance evaluation in the fiber laser system 1, does/do not need to include the laser beam measuring section 28 or the Stokes beam measuring section 29.

As described above, in a case where the processing object 5 is to be processed with the use of a laser beam, the processing object 5 has a highest reflectance during a period between (i) a time point at which the processing object 5 starts to be irradiated with a laser beam and (ii) a time point before the processing object 5 starts being melted by energy of the laser beam. That is, the processing object 5 has a highest reflectance at processing start time. Therefore, at the processing start time at which the processing object 5 has the highest reflectance, it is preferable to turn on a laser beam source (i.e. FLU) included in an optical system which has a high property of restricting stimulated Raman scattering, that is, a high reflection resistance.

Therefore, it is possible to evaluate the reflection resistance as described above, and arrange the FLUs 2a, 2b, and 2c in order of reflection resistance, from highest reflection resistance (third fiber laser unit) to lowest reflection resistance (fourth fiber laser unit). For example, in a case where the FLUs 2a, 2b, and 2c are arranged in this order, from the highest reflection resistance to the lowest reflection resistance as a result of evaluating the reflection resistance, it is preferable to turn on the FLU 2a first, and, a certain time Ts later, turn on the FLU 2b, and, the certain time Ts later, turn on the FLU 2c.

At the processing start time at which processing of the processing object 5 starts, a time required for melting of the processing object 5 to start is preferably shortened by increasing a power of a laser beam. Therefore, an output of FLU 2a to rise first at the time of start processing the processing object 5 is preferably higher than outputs of the FLUs 2b and 2c. Note that the higher an output of a FLU, the larger a peak of a power of light guided through the fiber laser system. This causes an increase in Raman gain of stimulated Raman scattering. However, since the FLU 2a to be turned on first has a highest reflection resistance as described above, the FLU 2a has a lowest probability of causing unstable laser oscillation while the FLU 2a is turned on. Therefore, it is reasonable to cause the FLU 2a to have the highest output.

In a case where it is possible to melt the processing object 5 only with the use of the FLU 2a to turn on, an intensity of reflected light returned from the processing object 5 after the processing object 5 has been melted is remarkably weakened. In this case, therefore, laser oscillation is unlikely to be unstable even if the FLUs 2b and 2c are turned on while the intensity of the reflected light is remarkably weakened.

In each of Embodiments described above, the LDs each have temperature dependence, that is, an increase in temperature causes an output with respect to a given driving current to be lowered. Therefore, the control section 7 preferably carries out control so that outputs of the LDs are not lowered even in a case where the temperatures of the LDs increase as irradiation of the processing object 5 with laser beams proceeds.

[Summary]

A fiber laser system in accordance with an aspect of the present invention includes:

(1) a plurality of fiber laser units including respective excitation light sources;

(2) a combiner for combining respective plurality of laser beams outputted from the plurality of fiber laser units;

(3) a plurality of current sources provided so as to correspond to the respective plurality of fiber laser units such that the plurality of current sources supply respective driving currents to corresponding ones of the excitation light sources; and (4) a control section for controlling the plurality of current sources so that there is a time interval of a certain time between adjacent peaks which appear in a case where respective powers of laser beams outputted from at least two fiber laser units of the plurality of fiber laser units rise.

With the configuration, the control section for controlling the plurality of current sources so that there is a time interval of a certain time between adjacent peaks which appear in a case where respective powers of laser beams outputted from at least two fiber laser units of the plurality of fiber laser units rise. It is therefore possible to prevent at least two peaks, of the plurality of peaks of the powers of the laser beams, from simultaneously appearing. In other words, it is possible to prevent at least two peaks, of the plurality of peaks of the powers of the laser beams, from overlapping so that respective values of the at least two peaks are summed. This allows for restriction of an excessively large peak appearing in a case where a power of a laser beam, which is generated by combining the laser beams, rises.

Therefore, it is possible to restrict an increase in Raman gain of SRS that occurs in a stage by which the combiner is followed in the fiber laser system. This improves reliability of the fiber laser system when the fiber laser units are turned on.

The fiber laser system in accordance with an aspect of the present invention is preferably configured so that: respective powers of the plurality of laser beams are converged onto a steady level after the peaks appear; and the certain time is equal to or greater than a time (T4) which is a length of time between (A) a time point at which a first power having risen reaches a first steady level and (B) a time point at which the first power having reached a first peak attenuates to reach the first steady level again, where (i) the first peak is a peak appearing earlier of two peaks that appear at respective times as a result of the plurality of laser beams being outputted, (ii) the first power is a power of a laser beam having the first peak, and (iii) the first steady level is a steady level onto which the first power is converged.

According to the configuration, there is a time interval of, as the certain time, equal to or greater than the time (T4) between the two peaks and appearing adjacently in time. This makes it possible to reliably prevent the two peaks from simultaneously appearing.

Note that any of the powers of two laser beams corresponding to the two peaks can rise earlier than the other, and there is thus no restriction. Alternatively, the powers of the two laser beams can rise simultaneously (this will be hereinafter referred to as "non-restrictive condition 1" in regard to the timings of power rising). As long as the configuration is satisfied, each fiber laser unit can have its unique characteristics such as (i) a delay time from (a) a time point at which a current source is turned on to (b) at time point at which a power of a laser beam corresponding to the current source starts rising, (ii) a rate at which a power of a laser beam rises, (iii) a level of a peak to be reached, and (iv) a value of a steady level (this will be hereinafter referred to as "non-restrictive condition 2" in regard to the characteristics of the fiber laser units).

The fiber laser system in accordance with an aspect of the present invention is preferably configured so that: respective powers of the plurality of laser beams are converged onto a steady level after the peaks appear; and the certain time is equal to or greater than a time (T5) which is a length of time between (A) a time point at which a first power reaches a first peak and (B) a time point at which the first power is converged onto a first steady level, where (i) the first peak is a peak appearing earlier of two peaks that appear at respective times as a result of the plurality of laser beams being outputted, (ii) the first power is a power of a laser beam having the first peak, and (iii) the first steady level is a steady level onto which the first power is converged.

According to the configuration, there requires a time from (i) a time point at which the first power having reached the first peak attenuates to reach the first steady level to (ii) a time point at which the first power is ultimately converged onto the first steady level. Therefore, in comparison with the aspect in which there is a time interval of equal to or greater than the time (T4) between two peaks, the time (T5) is ordinarily longer than the time (T4). Therefore, a longer time interval between two peaks appearing at respective times can be secured. Note that the earlier-described non-restrictive conditions 1 and 2 also apply to the configuration.

The fiber laser system in accordance with an aspect of the present invention can be configured so that the certain time is equal to or greater than a total time obtained by combining a Ta and a TA together, where (i) a peak appearing earlier of two peaks that appear at respective times as a result of the plurality of laser beams being outputted is a first peak, (ii) a power of a laser beam having the first peak is a first power, (iii) a peak appearing later of the two peaks is a second peak, a power of a laser beam having the second peak is a second power, (iv) the Ta is a length of time between (A) a time point at which the first power having risen reaches a half value of the first peak and (B) a time point at which the first power reaches the first peak, and (v) the TA is a length of time between (A) a time point at which the second power having risen reaches a half value of the second peak and (B) the second power reaches the second peak.

According to the configuration, the certain time is decided with the use of the half values of the peaks and the time Ta and the time TA based on the peaks. This allows two peaks appearing adjacently in time to be reliably prevented from simultaneously appearing. Note that the earlier-described non-restrictive conditions 1 and 2 also apply to the configuration.

The fiber laser system in accordance with an aspect of the present invention can be configured so that the control section controls a first current source and a second current source of the plurality of current sources which correspond to a first fiber laser unit and a second fiber laser unit, respectively, of the plurality of fiber laser units so that a second power rises at or later than time at which a first power reaches a first peak, where (i) the first peak is a peak appearing earlier of two peaks that appear at respective times as a result of the plurality of laser beams being outputted, (ii) the first power is a power of a laser beam having the first peak, (iii) a peak appearing later of the two peaks is a second peak, (iv) the second power is a power of a laser beam having the second peak, (v) the first fiber laser unit is a fiber laser unit that outputs the laser beam having the first peak, and (vi) the second fiber laser unit is a fiber laser unit that outputs the laser beam having the second peak.

According to the configuration, the value of the first peak is prevented from unfortunately increasing because of a rise of the second power having the second peak which appears later in time. This is because the second power rises at or later than time at which the first power reaches the first peak, and therefore the second power is not at a notable value when the first power reaches the first peak. This allows two peaks appearing adjacently in time to be reliably prevented from simultaneously appearing. Note that the earlier-described non-restrictive conditions 1 and 2 also apply to the configuration.

The fiber laser system in accordance with an aspect of the present invention can be configured so that the control section controls the plurality of current sources so that there are time intervals of a certain time between peaks appearing in a case where respective powers of laser beams outputted from all of the plurality of fiber laser units rise.

With the configuration, it is possible to prevent all of the plurality of peaks of the powers of the laser beams from simultaneously appearing. In other words, it is possible to prevent the plurality of peaks of the powers of the laser beams from overlapping so that respective values of the plurality of peaks are summed. This further allows for restriction of an excessively large peak appearing in a case where a power of a laser beam, which is generated by combining the laser beams, rises.

The fiber laser system in accordance with an aspect of the present invention can be configured so that the control section controls the plurality of current sources so that there are time intervals of a certain time between supplying start times at which the plurality of current sources start supplying the respective driving currents to the corresponding ones of the excitation light sources.

With the configuration, the present invention can be achieved by such simple control of the control section as giving, to the current sources with respective timings, an instruction to start supplying a driving current to the corresponding excitation light source.

Note that the present invention is not limited to the control described above. Alternatively, the control section can control the sizes of driving currents supplied from the current sources to the respective laser beam sources. Specifically, the control section can control the current sources so that the driving currents outputted from the plurality of current sources have respective sizes. The former control is based on the following principle: The larger a size of a driving current, the earlier a power of a laser beam outputted from a laser beam source rises. In other words, time at which a peak of a larger power of a laser beam appears earlier than time at which a peak of a smaller power of a laser beam appears.

The fiber laser system in accordance with an aspect of the present invention is preferably configured so that: the at least two fiber laser units includes (i) a third fiber laser unit having a reflection resistance for restricting stimulated Raman scattering and (ii) a fourth fiber laser unit having a reflection resistance lower than the reflection resistance of the third fiber laser unit; and the control section controls the plurality of current sources so that the third fiber laser unit is caused to output a laser beam earlier than the fourth fiber laser unit by causing an excitation light source of the third fiber laser unit to start receiving a driving current before an excitation light source of the fourth fiber laser unit starts receiving a driving current.

The fiber laser system in accordance with an aspect of the present invention can be preferably configured so that: the at least two fiber laser units includes (i) a third fiber laser unit and (ii) a fourth fiber laser unit having a reflection resistance lower than a reflection resistance of the third fiber laser unit; and the control section turns on the third fiber laser unit and the fourth fiber laser unit so that a peak, which appears in a case where a power of a laser beam outputted from the third fiber laser unit rises, appears earlier than a peak which appears in a case where a power of a laser beam outputted from the fourth fiber laser unit rises.

According to the configuration, in a case where an object is to be processed with the use of a laser beam, the object has a highest reflectance during a period between (i) a time point at which the object starts to be irradiated with a laser beam and (ii) a time point at which the object starts being melted by energy of the laser beam. In a case where the object starts melting, absorbance of light at a melted part increases, so that reflectance becomes small. Therefore, at processing start time at which the object has the highest reflectance, it is preferable to turn on the third fiber laser unit which has a relatively high reflection resistance such as a property of restricting stimulated Raman scattering.

The fiber laser system in accordance with an aspect of the present invention is preferably configured so that the control section controls the plurality of current sources so that a plurality of fiber laser units, which has a highest reflection resistance, has a highest output power.

According to the configuration, at processing start time at which processing of the object starts, a time required for melting of the object to start is preferably shortened by increasing a power of a laser beam. Therefore, an output of a fiber laser unit to rise first at the time of start processing the object is preferably higher than an output of another fiber laser unit. Note that the higher an output of a fiber laser unit, the larger a peak of a power of light guided through the fiber laser system. This causes an increase in Raman gain of stimulated Raman scattering. However, since the fiber laser unit to be turned on first has a highest reflection resistance, the fiber laser unit to be turned on first has a lowest probability of causing unstable laser oscillation while a power of a laser beam from the fiber laser unit rises and is converged. Therefore, it is reasonable to cause the fiber laser unit, which is to be turned on first, to have the highest output.

The fiber laser system in accordance with an aspect of the present invention is preferably configured so that the control section turning on the at least two fiber laser units so that peaks, which appear in a case where the respective powers of the laser beams outputted from at least two fiber laser units rise, appear in an order decided in advance.

The fiber laser system in accordance with an aspect of the present invention is preferably configured so that: the order is a descending order in terms of reflection resistance; and the control section controls the plurality of current sources so that one of at least two fiber laser units, which one has a highest reflection resistance among those of the at least two fiber laser units, has a highest output power among those of the at least two fiber laser units.

The fiber laser system in accordance with an aspect of the present invention is preferably configured so that the control section controls the plurality of current sources so that one of the plurality of fiber laser units, which one has a highest reflection resistance among those of the plurality of fiber laser units, has a highest output power among those of the plurality of fiber laser units.

A laser beam outputting method in accordance with another aspect of the present invention is a method of outputting a laser beam in which the laser beam is obtained by driving a plurality of fiber laser units to output respective plurality of laser beams and by combining the plurality of laser beams together, the method including the step of: driving at least two fiber laser units of the plurality of fiber laser units so that there is a time interval of a certain time between adjacent peaks which appear in a case where respective powers of laser beams outputted from the at least two fiber laser units rise.

A laser beam outputting method in accordance with yet another aspect of the present invention is a method of outputting a laser beam in which the laser beam is obtained by driving a plurality of fiber laser units to output respective plurality of laser beams and by combining the plurality of laser beams together, the method including the steps of: evaluating respective reflection resistances of at least two fiber laser units of the plurality of fiber laser units; and turning on the at least two fiber laser units so that adjacent peaks, which appear in a case where respective powers of laser beams outputted from the at least two fiber laser units rise, appear in a descending order in terms of reflection resistance.

A laser beam outputting method in accordance with still yet another aspect of the present invention is a method of outputting a laser beam in which the laser beam is obtained by driving a plurality of fiber laser units to output respective plurality of laser beams and by combining the plurality of laser beams together, the method including the steps of: deciding, in advance, an order regarding at least two fiber laser units of the plurality of fiber laser units; and turning on the at least two fiber laser units so that adjacent peaks, which appear in a case where respective powers of laser beams outputted from the at least two fiber laser units rise, appear in an order corresponding to the order decided in advance.

With the methods, as described above, it is possible to prevent a problem from occurring to oscillation of a laser.

The present invention is not limited to the embodiments, but can be altered by a skilled person in the art within the scope of the claims. An embodiment derived from a proper combination of technical means each disclosed in a different embodiment is also encompassed in the technical scope of the present invention.

REFERENCE SIGNS LIST

1 Fiber laser system
2a FLU (fiber laser unit, third fiber laser unit)
2b FLU (fiber laser unit, fourth fiber laser unit)
2c FLU (fiber laser unit, fourth fiber laser unit)
3 Output combiner (combiner)
5 Processing object (object)
6a, 6b, 6c Current source
7 Control section
P1 Peak
Pe1 Peak (first peak)
Pe2 Peak (second peak)
Pw1 Power (first power)
Pw2 Power (second power)
Ps Steady level (first steady level)
T1, T2, Ta, TA, T4, T5 Time
Ts Certain time
x Certain time

The invention claimed is:

1. A fiber laser system comprising:
a plurality of fiber laser units including respective excitation light sources, a power of each of a plurality of laser beams outputted from the respective plurality of fiber laser units rising, then reaching a peak, and then decreasing to a steady level;
a combiner for combining the respective plurality of laser beams outputted from the plurality of fiber laser units;
a plurality of current sources provided so as to correspond to the respective plurality of fiber laser units such that the plurality of current sources supply respective driving currents to corresponding ones of the excitation light sources; and
a control section for controlling the plurality of current sources so that respective powers of laser beams outputted from at least two fiber laser units of the plurality of fiber laser units (i) reach the peak at respective different times and (ii) are combined at least in a period during which the powers are at the steady level.

2. The fiber laser system as set forth in claim 1, wherein:
respective powers of the plurality of laser beams are converged onto a steady level after the peaks appear; and
the certain time is equal to or greater than a time (T4) which is a length of time between (A) a time point at which a first power having risen reaches a first steady level and (B) a time point at which the first power having reached a first peak attenuates to reach the first steady level again, where (i) the first peak is a peak appearing earlier of two peaks that appear at respective times as a result of the plurality of laser beams being outputted, (ii) the first power is a power of a laser beam having the first peak, and (iii) the first steady level is a steady level onto which the first power is converged.

3. The fiber laser system as set forth in claim 1, wherein the control section controls the plurality of current sources so that there are time intervals of a certain time between peaks appearing in a case where respective powers of laser beams outputted from all of the plurality of fiber laser units rise.

4. The fiber laser system as set forth in claim 1, wherein the control section controls the plurality of current sources so that there are time intervals of a certain time between supplying start times at which the plurality of current sources start supplying the respective driving currents to the corresponding ones of the excitation light sources.

5. A fiber laser system comprising:
a plurality of fiber laser units including respective excitation light sources, a power of each of a plurality of laser beams outputted from the respective plurality of fiber laser units rising, then reaching a peak, and then decreasing to a steady level;
a combiner for combining respective plurality of laser beams outputted from the plurality of fiber laser units;
a plurality of current sources provided so as to correspond to the respective plurality of fiber laser units such that the plurality of current sources supply respective driving currents to corresponding ones of the excitation light sources; and
a control section for controlling the plurality of current sources so that respective powers of laser beams outputted from at least two fiber laser units of the plurality of fiber laser units (i) reach the peak at respective different times and (ii) are combined at least in a period during which the powers are at the steady level, the at least two fiber laser units including (i) a first fiber laser unit having a reflection resistance for restricting stimulated Raman scattering and (ii) a second fiber laser unit having a reflection resistance lower than the reflection resistance of the first fiber laser unit, and the control section controlling the plurality of current sources so that the first fiber laser unit is caused to output a laser beam earlier than the second fiber laser unit by causing an excitation light source of the first fiber laser unit to start receiving a driving current before an excitation light source of the second fiber laser unit starts receiving a driving current.

6. A fiber laser system comprising:

a plurality of fiber laser units including respective excitation light sources, a power of each of a plurality of laser beams outputted from the respective plurality of fiber laser units rising, then reaching a peak, and then decreasing to a steady level;

a combiner for combining respective plurality of laser beams outputted from the plurality of fiber laser units;

a plurality of current sources provided so as to correspond to the respective plurality of fiber laser units such that the plurality of current sources supply respective driving currents to corresponding ones of the excitation light sources; and a control section for controlling the plurality of current sources so that respective powers of laser beams outputted from at least two fiber laser units of the plurality of fiber laser units (i) reach the peak at respective different times and (ii) are combined at least in a period during which the powers are at the steady level, the at least two fiber laser units including (i) a first fiber laser unit and (ii) a second fiber laser unit having a reflection resistance lower than a reflection resistance of the first fiber laser unit, and the control section turning on the first fiber laser unit and the second fiber laser unit so that a peak, which appears in a case where a power of a laser beam outputted from the first fiber laser unit rises, appears earlier than a peak which appears in a case where a power of a laser beam outputted from the second fiber laser unit rises.

7. A fiber laser system comprising:

a plurality of fiber laser units including respective excitation light sources, a power of each of a plurality of laser beams outputted from the respective plurality of fiber laser units rising, then reaching a peak, and then decreasing to a steady level;

a combiner for combining respective plurality of laser beams outputted from the plurality of fiber laser units;

a plurality of current sources provided so as to correspond to the respective plurality of fiber laser units such that the plurality of current sources supply respective driving currents to corresponding ones of the excitation light sources; and a control section for controlling the plurality of current sources so that respective powers of laser beams outputted from at least two fiber laser units of the plurality of fiber laser units (i) reach the peak at respective different times and (ii) are combined at least in a period during which the powers are at the steady level, the control section turning on the at least two fiber laser units so that peaks, which appear in a case where the respective powers of the laser beams outputted from at least two fiber laser units rise, appear in an order decided in advance.

8. A method of outputting a laser beam in which the laser beam is obtained by driving a plurality of fiber laser units to output respective plurality of laser beams and by combining the plurality of laser beams together, a power of each of a plurality of laser beams outputted from the respective plurality of fiber laser units rising, then reaching a peak, and then decreasing to a steady level, the method comprising the step of:

driving at least two fiber laser units of the plurality of fiber laser units so that respective powers of laser beams outputted from the at least two fiber laser units (i) reach the peak at respective different times and (ii) are combined at least in a period during which the powers are at the steady level.

9. A method of outputting a laser beam in which the laser beam is obtained by driving a plurality of fiber laser units to output respective plurality of laser beams and by combining the plurality of laser beams together, a power of each of a plurality of laser beams outputted from the respective plurality of fiber laser units rising, then reaching a peak, and then decreasing to a steady level, the method comprising the steps of:

deciding, in advance, an order regarding at least two fiber laser units of the plurality of fiber laser units; and turning on the at least two fiber laser units so that adjacent peaks, which appear in a case where respective powers of laser beams outputted from the at least two fiber laser units rise, appear in an order corresponding to the order decided in advance so that respective powers of laser beams outputted from at least two fiber laser units of the plurality of fiber laser units (i) reach the peak at respective different times and (ii) are combined at least in a period during which the powers are at the steady level.

* * * * *